US008196212B2

(12) United States Patent
Tsusaka et al.

(10) Patent No.: US 8,196,212 B2
(45) Date of Patent: Jun. 5, 2012

(54) PERSONAL INFORMATION MANAGEMENT DEVICE

(75) Inventors: Yuko Tsusaka, Osaka (JP); Toru Hirose, Hyogo (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 12/293,642

(22) PCT Filed: Mar. 14, 2007

(86) PCT No.: PCT/JP2007/055061

§ 371 (c)(1),
(2), (4) Date: Sep. 19, 2008

(87) PCT Pub. No.: WO2007/122914

PCT Pub. Date: Nov. 1, 2007

(65) Prior Publication Data

US 2010/0235922 A1  Sep. 16, 2010

(30) Foreign Application Priority Data

Apr. 4, 2006  (JP) .................................. 2006-103567

(51) Int. Cl.
  *G06F 3/00* (2006.01)
(52) U.S. Cl. ............................ 726/26; 713/166; 707/781
(58) Field of Classification Search ........................ None
  See application file for complete search history.

(56) References Cited

U.S. PATENT DOCUMENTS

| 7,916,322 | B2 * | 3/2011 | Pineau .......................... 358/1.15 |
| 2001/0023421 | A1 * | 9/2001 | Numao et al. .................... 707/9 |
| 2004/0081338 | A1 | 4/2004 | Takenaka |
| 2004/0128557 | A1 * | 7/2004 | Sakushima et al. ........... 713/202 |
| 2005/0144460 | A1 * | 6/2005 | Yuriyama et al. ............. 713/182 |
| 2005/0193250 | A1 | 9/2005 | Takeuchi et al. |

FOREIGN PATENT DOCUMENTS

| JP | 10-93557 | 4/1998 |
| JP | 2004-62560 | 2/2004 |
| JP | 2005-190066 | 7/2005 |
| JP | 2005-301477 | 10/2005 |

OTHER PUBLICATIONS

International Search Report issued Jun. 12, 2007 in the International (PCT) Application of which the present application is the U.S. National Stage.
Nakajima, "Mail Filtering Soft: Kimitsu Joho Nado o Block", *Nikkei Internet Technology*, No. 31, Nikkei Business Publications, Inc., pp. 120-127, Jan. 2000.
English language translation of Nakajima, "Mail Filtering Soft: Kimitsu Joho Nado o Block", *Nikkei Internet Technology*, No. 31, Nikkei Business Publications, Inc., pp. 120-127, Jan. 2000.

* cited by examiner

*Primary Examiner* — Shewaye Gelagay
(74) *Attorney, Agent, or Firm* — Wenderoth, Lind & Ponack, L.L.P.

(57) ABSTRACT

A personal information management apparatus acquires associated information that is associated with target information for which transmission has been requested, and if the acquired associated information includes personal information, transmits the target information after modifying the associated portions of the target information. This structure enables improving protection of personal information by protecting not only personal information but also information that cannot be used independently to identify a person but can be easily correlated with other information and used to identify a specific individual with reference to the other information.

17 Claims, 16 Drawing Sheets

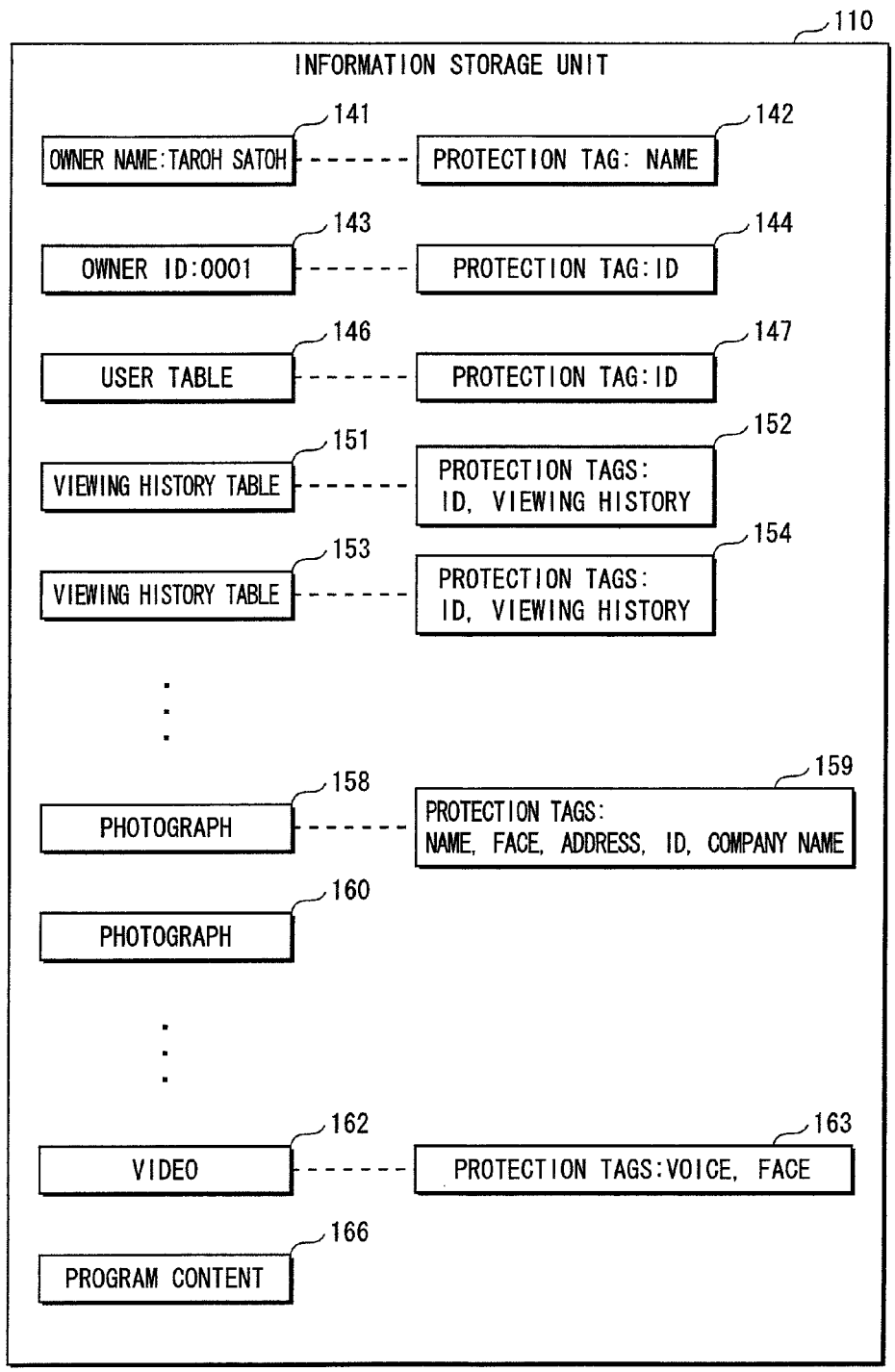

FIG. 5A

USER TABLE 146

| USER INFORMATION ||
|---|---|
| USER NAME | USER ID |
| PAPA | 0001 | — 171
| MAMA | 0002 | — 172
| OLDER SISTER | 0003 |
| YOUNGER SISTER | 0004 |
| DOG | 0005 |

FIG. 5B

VIEWING HISTORY TABLE 151

| USER ID:0001 | | | | — 175 |
|---|---|---|---|---|
| VIEWING HISTORY INFORMATION | | | | |
| DATE AND TIME | CHANNEL | PROGRAM NAME | GENRE | |
| 2006.01.03.21:00 | 4 | TODAY'S NEWS | INFORMATION | — 176 |
| 2006.01.05.19:00 | 2 | N LEAGUE SOCCER | SPORTS | — 177 |
| 2006.01.06.21:05 | 6 | NIGHT BASEBALL BROADCAST | SPORTS | — 178 |
| ⋮ | ⋮ | ⋮ | ⋮ | |

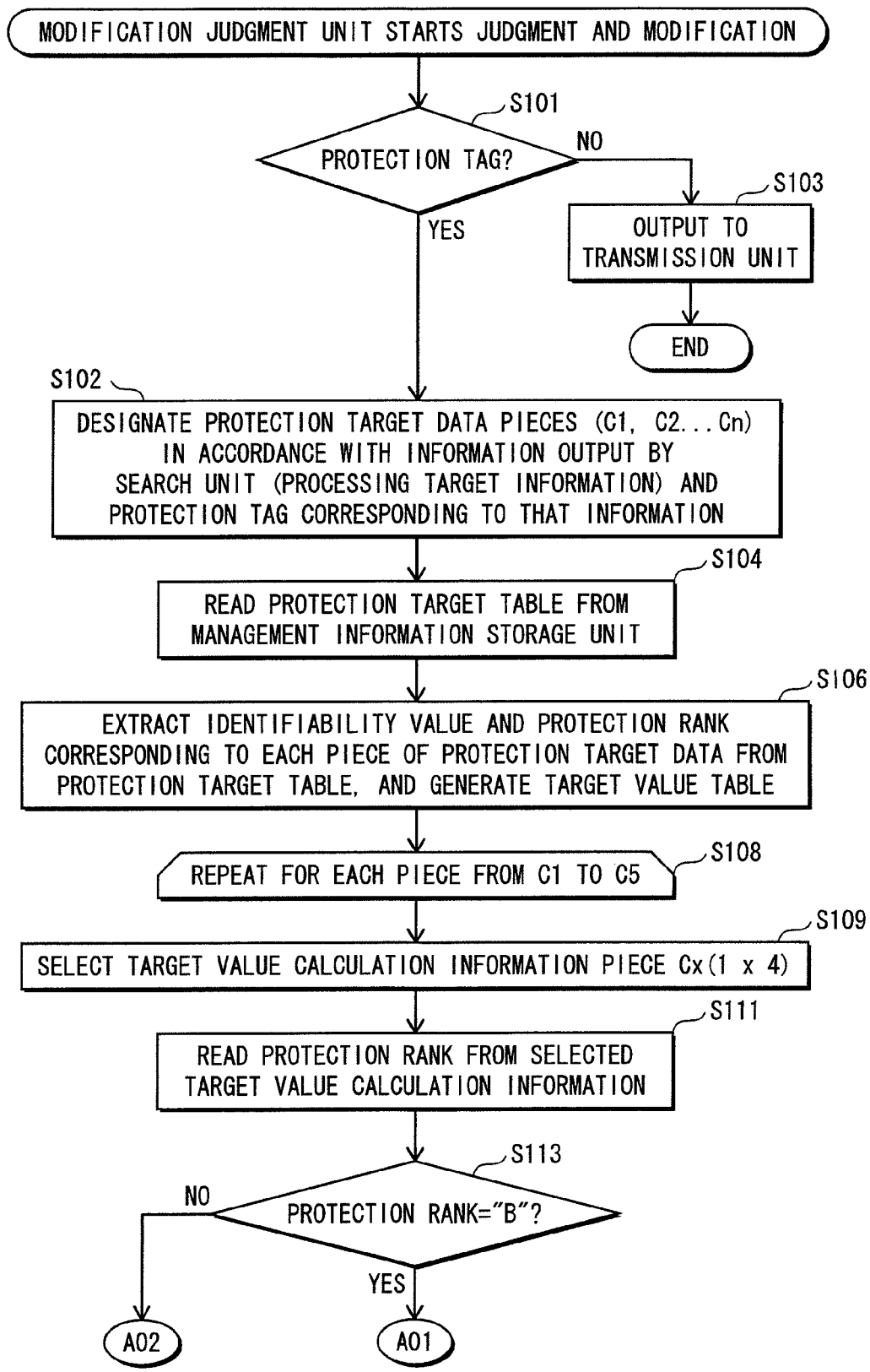

TARGET VALUE TABLE 201

| TARGET VALUE CALCULATION INFORMATION | | |
|---|---|---|
| IDENTIFICATION NUMBER | IDENTIFIABILITY VALUE | PROTECTION RANK |
| C1 | 8 | A |
| C2 | 3 | B |
| C3 | 10 | A |
| C4 | 5 | B |
| C5 | 10 | A |

— 202
— 203
— 204
— 205
— 206

PERSONAL INFORMATION MANAGEMENT DEVICE

TECHNICAL FIELD

The present invention relates to protecting personal information that can identify a specific individual, and in particular to technology for suppressing a leak of information that is not personal information in itself but can identify the specific individual with reference to other information.

BACKGROUND ART

In recent years, the necessity of protecting personal information that can identify a specific individual has been much talked about.

As exemplary technology for protecting personal information, patent document 1 discloses detecting facial images in a video that has been captured by a security camera and input to a computer, and checking whether the detected facial images match any designated persons (for example, wanted criminals) registered in a recording apparatus. If a detected facial image does not match any of the designated persons, mosaic processing is performed on the detected facial image. If a detected facial image matches a designated person, rather than performing mosaic processing, the facial image is left as is. This technology enables acquiring information about designated persons and the surrounding circumstances thereof, while protecting facial images of people other than the designated persons, which are pieces of personal information that can be used to identify those people.

In the present description, information pertaining to an individual that can be used to identify that specific individual is referred to as personal information.

Patent document 1: Japanese Patent Application Publication No. 2004-62560

Patent document 2: Japanese Patent Application Publication No. 2005-301477

SUMMARY OF THE INVENTION

Problems Solved by the Invention

In the technology of patent document 1, although mosaic processing is performed on facial images of individuals, other portions of an image remain as is. Therefore, information pertaining to an individual, e.g. a company logo, a school insignia, or a personal possession such as a purse or briefcase may be included in the image. Such information cannot be used independently to identify the specific individual. However, such information can be easily correlated with other information, and if the specific individual can be identified by the other information, such information must also be protected.

Meanwhile, web services are being developed that collect information pertaining to an individual via a network, and provide products, information, and services suited to the individual based on the collected information. When various pieces of information are collected by this type of web service or the like, there are cases in which information that cannot be used independently to identify an individual can be correlated with other collected information to identify the specific individual. Accordingly, even if the information cannot be used independently to identify the specific individual, there is a risk that providing such information as is would ultimately be the same as leaking personal information.

Also, under conditions in which devices can easily reference pieces of information via a network, even if a piece of information cannot independently identify the individual, if personal information exists that can be referenced based on the piece of information, there is a risk of the specific individual being identified.

In view of the above problem, the present invention aims to provide a personal information management apparatus, method, and program that can improve protection of personal information by protecting not only personal information but also information that cannot be used independently to identify the individual.

Means to Solve the Problems

To achieve the above aim, the present invention is a personal information management apparatus including an acquisition unit operable to acquire an output request for target information that is information targeted for output; a storage unit operable to store therein information necessary for specifying an individual in correspondence with target value information that includes protection rank information, the information necessary for specifying the individual being included in the target information, the target value information being information for judging if the target information is to be protected, and the protection rank information indicating a level of confidentiality of the information necessary for specifying the individual; a search unit operable to, in accordance with the protection rank information, search for associated information that includes information identical to the information necessary for specifying the individual; a determination unit operable to, if the associated information is found by the search unit, determine whether the target value information is to be changed, with use of the associated information; a change unit operable to change the target value information to generate changed target value information if a result of the determination by the determination unit is affirmative; a judgment unit operable to (i) if the result of the determination is affirmative, judge whether the target information is to be protected, with use of the changed target value information, and (ii) if the result of the determination is negative, judge whether the target information is to be protected, with use of the target value information stored in the storage unit; and a protection unit operable to protect the target information if the judgment unit has judged affirmatively.

Here, in the personal information management apparatus, the target value information may further include first protection tag information in correspondence with the information necessary for specifying the individual and the protection rank information, the storage unit may further store therein the associated information and second protection tag information in correspondence with the associated information, and if the associated information is found by the search unit, the determination unit may search for the first protection tag information associated with the second protection tag information, and determine whether the target value information is to be changed, with reference to the protection rank information in correspondence with the first protection tag information.

Here, in the personal information management apparatus, the target value information may further include identification information that identifies the information necessary for specifying the individual, and the search unit may search for the associated information with use of the protection rank information and the identification information.

Here, the personal information management apparatus may further include: an output unit operable to output the target information; and an identifiability value determination unit operable to determine, with use of the target value information, an overall identifiability value indicating how easily the individual can be identified, wherein the storage unit may further store a threshold that divides a group of information pieces that can collectively identify the individual and a group of information pieces that cannot collectively identify the individual, and the judgment unit may judge, by comparing the overall identifiability value to the threshold, whether the target information is to be protected.

Here, in the personal information management apparatus, the judgment unit may compare the overall identifiability value to the threshold, and if the overall identifiability value is greater than the threshold, judge that the target information is to be protected, if the judgment unit has judged affirmatively, the protection unit may modify the information necessary for specifying the individual to generate modified information, and if the judgment unit has judged affirmatively, instead of the information necessary for specifying the individual, the output unit may output the modified information.

Effects of the Invention

According to the above structure, even if the target information is information that is difficult to use for identifying an individual, if the specific individual can be easily identified by the associated information that is associated with the target information, the target information is targeted for protection. This enables also protecting the associated information that is associated with the target information.

Also, according to the above structure, if the overall identifiability value is larger than the threshold, the protection unit modifies the target information. For this reason, a superior effect is achieved, namely that identifying the specific individual by the modified information that is actually output is difficult, and thus a risk of the specific individual being identified by the modified information is suppressed.

Here, in the personal information management apparatus, the judgment unit may compare the overall identifiability value to the threshold, and if the overall identifiability value is greater than the threshold, judge that the target information is to be protected, and the protection unit may prohibit output of the target information if the judgment unit has judged affirmatively.

According to this structure, since the protection unit prohibits transmission of the target information if the overall identifiability value is larger than the threshold, the personal information management apparatus can reliably maintain the confidentiality of the target information that can identify the individual.

Here, the personal information management apparatus may further include: an associated information judgment unit, wherein the acquisition unit may further acquire a transmission distance that indicates an amount of separation from a personal information management apparatus body, and the associated information judgment unit may compare the transmission distance to a predetermined threshold, and if the transmission distance is less than the predetermined threshold, judge information found by the search unit to be the associated information.

Devices that have a small amount of separation from the personal information management apparatus are likely to be, for example, devices set up in the same household as the personal information management apparatus, and to belong to the same person or a person associated closely with that person (such as a family member). Accordingly, information held in each device is likely to pertain to the same person, or a person in the same organization (family, etc.), as information held in other devices. Here, for example, the communication distance is expressed by an amount of time required for transmitting data to, or receiving data from, the personal information management apparatus, or a number of relay devices that exist between the personal information management apparatus and the device.

According to this structure, information having an amount of separation that is less than the threshold is considered associated information. Prohibiting output of the target information if the associated information includes personal information enables achieving a superior effect, namely averting a risk of personal information included in the associated information being referenced with use of the target information, and thus reliably maintaining the confidentiality of personal information included in the associated information.

Here, in the personal information management apparatus, the target value information may further include an identifiability value in correspondence with the information necessary for specifying the individual, and the identifiability value determination unit may determine the overall identifiability value with use of the identifiability value.

Here, in the personal information management apparatus, the target information may include a plurality of information pieces necessary for specifying the individual, and the identifiability value determination unit may determine the overall identifiability value with use of a target value obtained by adding together all of a plurality of identifiability values that are in correspondence with the plurality of pieces of information necessary for specifying the individual.

According to this structure, the identifiability value determination unit acquires an identifiability value for each piece of the information necessary for specifying the individual, and performs a simple calculation, namely adding together all of the acquired identifiability values, to obtain the overall identifiability value.

Here, in the personal information management apparatus, the judgment unit may judge a piece of information necessary for specifying the individual that corresponds to a highest one of the plurality of identifiability values to be a facilitating portion that facilitates identifying the individual in the target information.

According to this structure, the higher the identifiability value of a piece of information, the more easily the individual can be identified by that piece of information. In the above structure, since the information piece that has the highest identifiability value is modified, the ease of using the target information to identify the individual can be efficiently reduced.

Here, in the personal information management apparatus, the information necessary for specifying the individual may be one of a name, an address, a facial image and a mobile telephone number, and if the associated information includes one of the name, the address, the facial image and the mobile telephone number, the judgment unit may judge affirmatively.

Also, in the personal information management apparatus, the change unit may change the target value information in accordance with a user operation.

According to this structure, the change unit enables reflecting the intention of the user at any time, thereby increasing user-friendliness.

According to this structure, the change unit enables reflecting the intention of the user in the identifiability value table at any time, thereby increasing user-friendliness.

Here, the personal information management apparatus of claim 1 may further include: an associated information acquisition unit operable to acquire associated information that is associated with the target information, wherein the identifiability value acquisition unit, in place of the overall identifiability value, may acquire a compound identifiability value that indicates how easily the individual can be identified by the target information and the associated information, and the judgment unit, in place of the overall identifiability value, may compare the compound identifiability value to the threshold.

Here, in the personal information management apparatus of claim 8, the storage unit may further store a history value, and the identifiability value determination unit may determine a value obtained by adding together the history value and the target value as the overall identifiability value.

According to this structure, the identifiability value determination unit acquires a history value indicating how easily the specific individual can be identified by the associated information output previously to the source of the output request, and obtains the overall identifiability value by adding together the history value and the target value. For this reason, if the history value is large, that is, if the individual can easily be identified by the information output previously to the source of the output request, the target information is modified even if the target value is small, thus enabling suppressing an increase in the ease of identifying the individual by the group of information held by the source of the output request.

Here, a personal information management apparatus body may be connected to a terminal apparatus, information held in the personal information management body and the terminal apparatus being mutually usable by each other, and the search unit may search one of the personal information management apparatus body and the terminal apparatus for the associated information.

Since mutually held information is shared between the terminal apparatus and the personal information management apparatus, there is a high likelihood that information held by both apparatuses pertain to the same person or to a plurality of associated people.

According to this structure, the identifiability value acquisition unit acquires the history value pertaining not only to information output previously by the personal information management apparatus to the source of the output request, but also to the associated information output by the terminal apparatus to the source of the output request. For this reason, the modification unit also modifies the target information if information that can easily identify the individual has been previously output from the terminal apparatus to the source of the output request. This enables suppressing an increase in the ease of identifying the individual by the group of information pieces held by the source of the output request.

In the personal information management apparatus, the target information may include an address indicating a location where the associated information is stored, and the search unit may search the location indicated by the address for the associated information.

According to this structure, the associated information is stored in the location indicated by the address. For this reason, modifying the address in the target information enables reliably blocking the route for referencing the associated information with use of the target information.

Here, in the personal information management apparatus, the information necessary for specifying the individual may be one of a name, an address, a facial image and a mobile telephone number, and if the associated information includes one of the name, the address, the facial image and the mobile telephone number, the judgment unit may judge affirmatively.

According to this structure, the judgment unit judges that the associated information includes personal information if the associated information includes data belonging to one of the classes of name, address, facial image, or mobile telephone number. For this reason, the personal information management apparatus can reliably judge information that can be used to identify the specific individual very easily.

Here, in the personal information management apparatus, the target information may be a photograph, and the information necessary for specifying the individual may be a predetermined graphic or a character string in the photograph.

According to this structure, the associated information acquisition unit acquires the associated information that has been correlated to the photograph by the character string and the graphic appearing in the photograph, and can reliably maintain the confidentiality of the associated information.

Here, the personal information management apparatus may further include: a notification unit operable to, if the determination unit has determined affirmatively, notify a user that output of information associated with the information necessary for specifying the individual has been requested.

According to this structure, since the notification unit notifies the user that output of the target information has been requested, the user can be informed that output of information associated with personal information has been requested.

BRIEF DESCRIPTION OF THE DRAWINGS

FIG. 4 shows exemplary information stored in an information storage unit 110;

FIG. 5A shows the particulars of a user table 146, and FIG. 5B shows the particulars of a viewing history chart 151;

FIG. 7 is a flowchart showing judgment and modification processing performed by a modification judgment unit 106;

Figure 1:
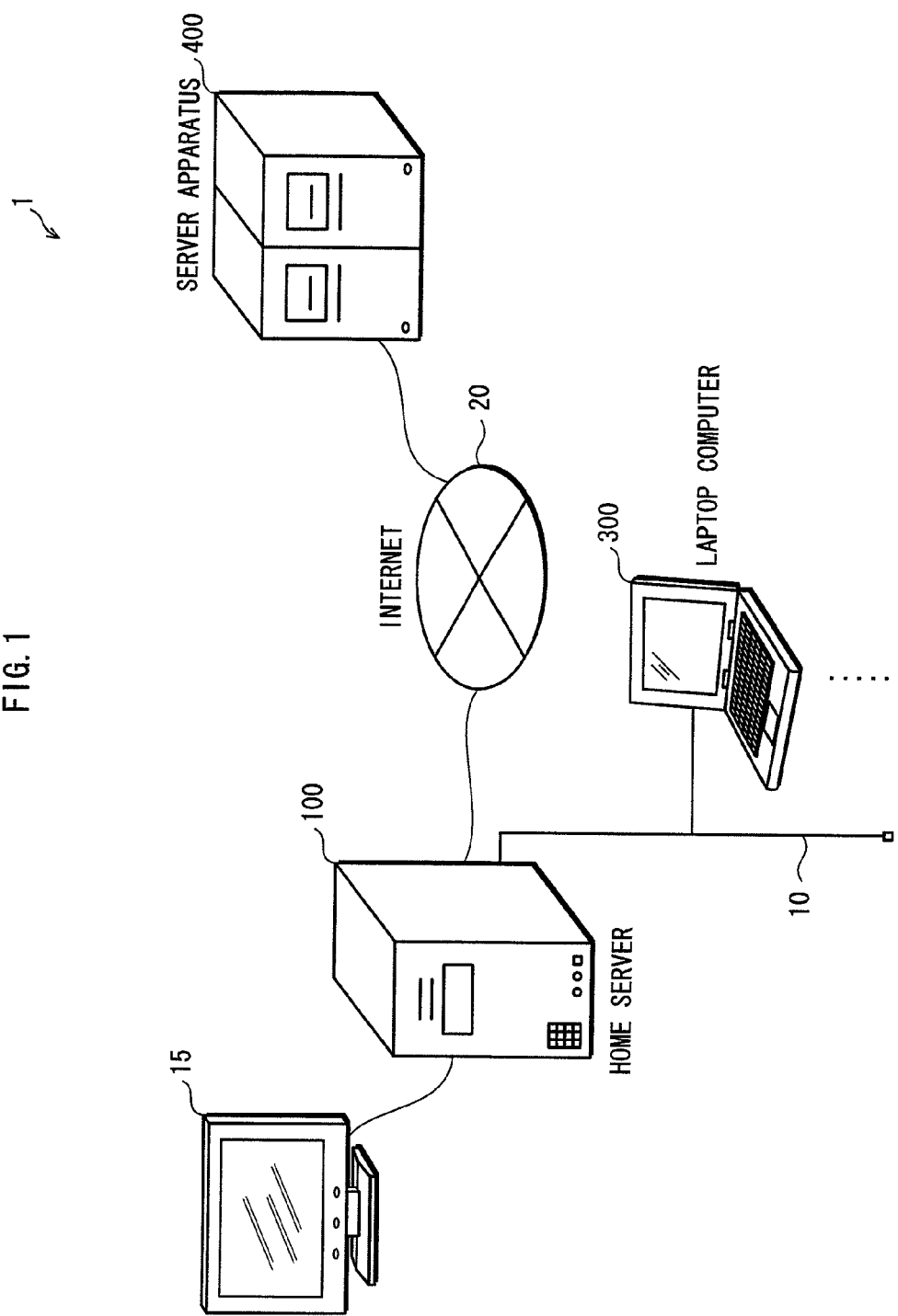
FIG. 1 shows a structure of a personal information management system 1 pertaining to embodiment 1.

DESCRIPTION OF THE CHARACTERS 1 personal information management system
10 LAN
15 monitor
20 Internet
100 home server
101 antenna
102 broadcast reception unit
103 I/O unit
104 request reception unit
105 search unit
106 modification judgment unit
107 control unit
108 transmission unit
109 LAN communication unit
110 information storage unit
111 management information storage unit
112 input unit
113 display output unit
121 protection target table
133 access history table
201 target value table
300 laptop computer
400 server apparatus

DETAILED DESCRIPTION OF THE INVENTION

1. Embodiment 1

The following describes a personal information management system 1 pertaining to embodiment 1 of the present invention, with reference to the drawings.

1.1 Overview of the Personal Information Management System 1

As shown in FIG. 1, the personal information management system 1 includes a server apparatus 400, a home server 100, and a laptop computer 300.

The home server 100 and the server apparatus 400 are connected to an Internet 20. Also, the home server 100 and the laptop computer 300 are set up in the same household, and are connected to each other via a LAN 10.

The home server 100 receives a television broadcast, and causes the received television program to be displayed on a monitor 15. Also, in accordance with an operation by a user, the home server 100 records the received television program.

The home server 100 is used by a plurality of users in the household, and creates viewing history charts of television broadcasts on a user-by-user basis. Also, in addition to the television programs and the viewing history charts, the home server 100 also stores various types of information such as music and photographs.

The server apparatus 400 acquires the various types of information from the home server 100, and provides information and services appropriate to each user of the home server 100 in accordance with the acquired information. For example, the server apparatus 400 acquires a viewing history chart of television broadcasts, and recommends a television program according to the preferences of the user.

Before transmitting information requested by the server apparatus 400, the home server 100 verifies whether personal information is included in the requested information. The home server 100 then verifies whether data is included that is not personal information but could be used to reference personal information. Hereinafter, personal information and information that is not personal information but can be used as a key to reference personal information are referred to collectively as protection target data. Examples of protection target data include names of individuals, addresses, company names and IDs.

If protection target data is included in the requested information, the protection target data is modified as needed before the requested information is transmitted.

1.2 Home Server 100

Figure 2:
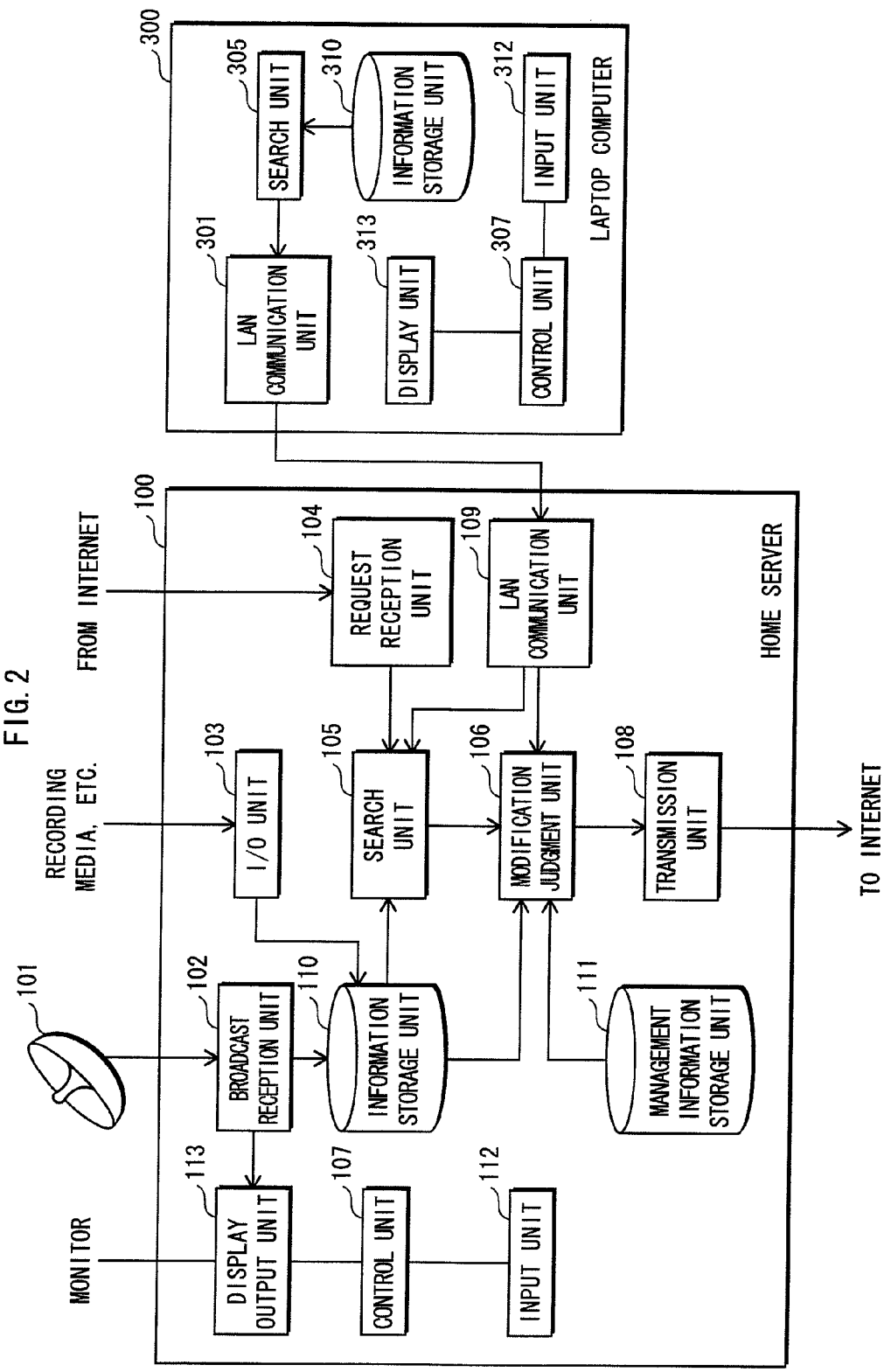
FIG. 2 is a functional block diagram showing a functional structure of a home server 100 and a laptop computer 300.

FIG. 2 is a functional block diagram showing a functional structure of the home server 100 and the laptop computer 300. As shown in FIG. 2, the home server 100 includes an antenna 101, a broadcast reception unit 102, an I/O (input/output) unit 103, a request reception unit 104, a search unit 105, a modification judgment unit 106, a control unit 107, a transmission unit 108, a LAN communication unit 109, an information storage unit 110, a management information storage unit 111, an input unit 112, and a display output unit 113. Note that arrows in the drawing indicate the flow of information in each apparatus and between the apparatuses. Also, although the specific details of the wiring and the like are omitted, the control unit 107 is connected to all of the constituent elements.

The home server 100 is a computer system that specifically includes a RAM, a ROM, and a microprocessor. The RAM and the ROM store computer programs. The microprocessor, by operating according to the computer programs, enables realization of some of the functions of the home server 100.

Each of the constituent elements is described below.

(1) Management Information Storage Unit 111

Figure 3:
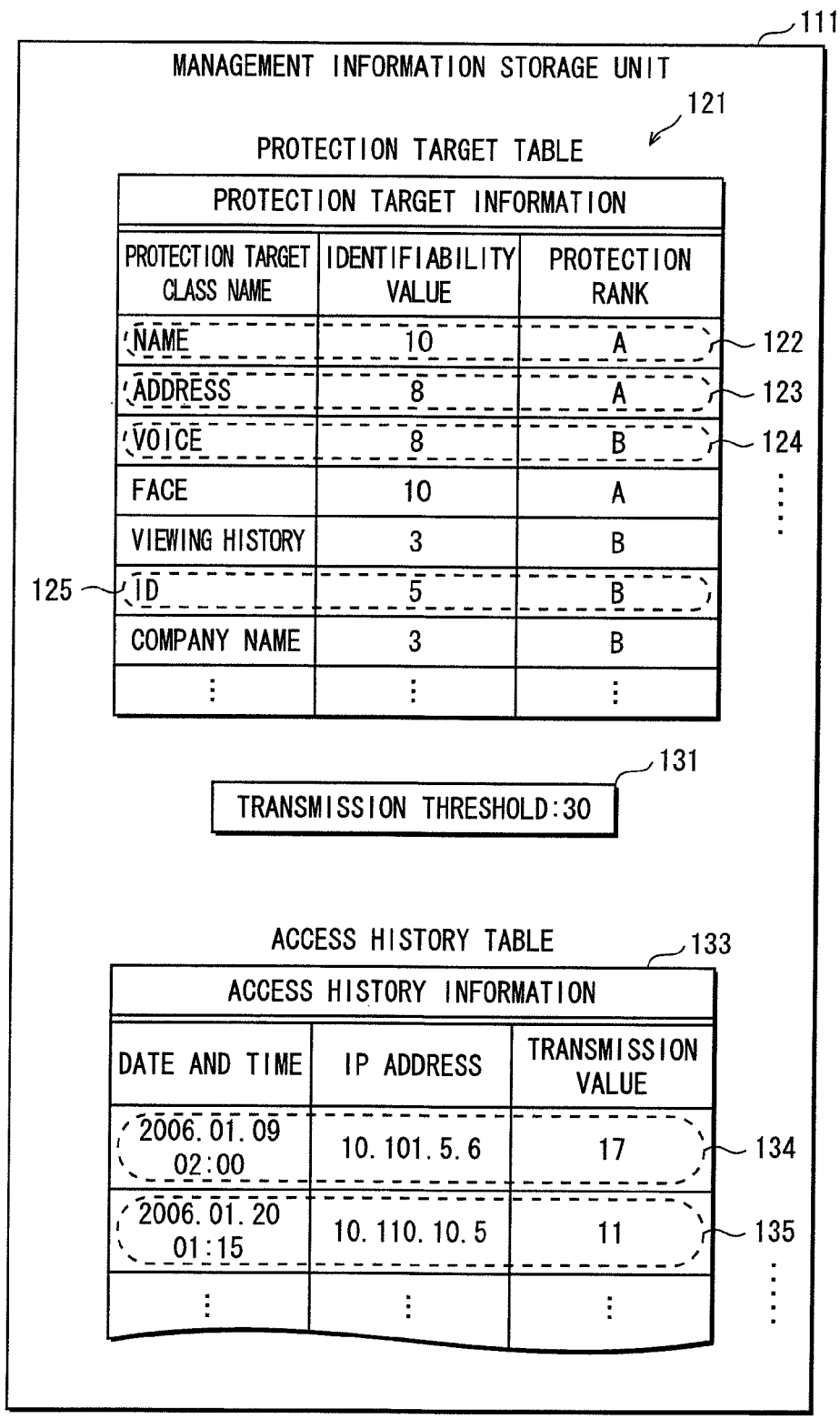
FIG. 3 shows exemplary information stored in a management information storage unit 111.

The management information storage unit 111 includes a hard disk, and as shown in FIG. 3, stores, for example, a protection target table 121, a transmission threshold 131, and an access history table 133. Note that in addition, the management information storage unit 111 stores various types of image data, audio data, computer programs, etc. used by the control unit 107.

The protection target table 121 includes a plurality of protection target information pieces 122, 123, 124, etc., each of which includes a protection target class name, an identifiability value, and a protection rank. The protection target class name indicates a name of a type of data (hereinafter referred to as the protection target class name) into which the protection target data has been classified. As shown in FIG. 3, the protection target classes include name, address, voice, etc. The protection target class names included in the protection target table 121 shown in FIG. 3 are examples, and additionally may include telephone number, mobile telephone number, e-mail address, age, gender, etc. Hereinafter, a protection target class whose protection target class name is "A" is referred to as "protection target class A" or simply "A".

The identifiability value indicates, as a numerical value from 1 to 10, how easily a specific individual can be identified by the protection target data belonging to that protection target class. The higher the identifiability value, the more easily a specific individual can be identified by the protection target data belonging to that protection target class.

The protection rank indicates whether the piece of information is personal information. Protection rank "A" indicates that the piece of information is personal information and therefore absolutely must be kept confidential. Protection rank "B" indicates that the piece of information is not personal information, and therefore confidentially is not necessarily required.

For example, the protection target information piece 122 includes a protection target class name "name", an identifiability value "10", and a protection rank "A". A protection target data piece in the protection target class "name" is a name indicating a specific individual, and since the specific individual can be identified extremely easily, the identifiability value is "10", which is the maximum value. Also, since the protection target data piece belonging to the protection target class "name" is personal information that can be used independently (that is, without referencing other information) to identify the specific individual, the protection rank is "A".

Also, the protection target information piece 124 includes the protection target class name "voice", the identifiability value "8", and the protection rank "B". Although a protection target data piece that is a voice of a person is information that corresponds to a single individual, the specific person cannot be identified without analyzing voice data or the like recorded in the past and comparing the data to the result of the analysis, and therefore the identifiability value is "8" and the protection rank is "B".

Also, the protection target information piece 125 includes the protection target class name "ID", the identifiability value "5", and the protection rank "B". Similarly to information of the type "name", the protection target data pieces of the type "ID" correspond to specific individuals on a one-to-one basis. However, unlike the information of the type "name", this information merely contains a string of letters and/or numbers. Since identifying a specific individual based on the character string alone is difficult, the identifiability value is "5" and the protection rank is "B".

The protection target table 121 may be recorded by the manufacturer when the home server 100 is produced, or may be recorded or edited by the control unit 107 after shipment when the input unit 112 receives an operation input by the user.

The transmission threshold 131 indicates, for a collection of information pieces, a point above which identifying an individual is possible, which is on the boundary between being able to identify the individual based on the collection of information pieces and not being able to identify the individual based on the collection of information pieces (as a measure of the ease of identifying the individual, the transmission threshold 131 is a threshold that divides a collection of information that can be used to identify the individual and a collection of information that cannot be used to identify the individual). The modification judgment unit 106 (details described later) calculates an overall identifiability value of personal information that indicates how easily the information requested for transmission by the server apparatus 400 and the information associated with the requested information can be used to identify an individual (details of the calculation method, etc., are described later). If the calculated overall identifiability value is greater than the transmission threshold, the requested information is transmitted after modifying the information to decrease the overall identifiability value.

The access history table 133 indicates a history of information transmitted by the home server 100 to an external device, and includes a plurality of access history information pieces 134, 135, etc. Each of the access history information pieces includes a date and time, an IP address, and a transmission value.

The date and time indicates when the external device requested transmission of the information. The IP address is the IP address of the external device that made the request. The transmission value is the sum of all identifiability values of the protection target data pieces included in the information transmitted by the home server 100. When a plurality of information pieces are transmitted at one time, the transmission value is the sum of the protection target data pieces included in all of the information pieces.

(2) Information Storage Unit 110

The information storage unit 110 includes a hard disk. As the example in FIG. 4 shows, the information storage unit 110 stores an owner name 141, an owner ID 143, a user table 146, viewing history charts 151, 153 etc., photographs 158, 160 etc., a video 162, a program content 166 and protection tags 142, 144 etc.

The owner name 141 is the name of the owner of the home server 100, and is recorded via an operation by the user when the home server 100 starts up for the first time. Here, the owner name 141 only includes the single piece of text data "Taroh Satoh". This piece of text data "Taroh Satoh" is protection target data belonging to the protection target class "name".

The owner ID 143 is an identifier that uniquely corresponds with the owner of the home server 100. The owner ID 143 includes a single data piece that is a number string "0001", and the number string data "0001" is protection target data belonging to the protection target class "ID".

As shown in FIG. 5A, the user table 146 includes a plurality of user information pieces 171, 172, etc., and each user information piece includes a user name and a user ID. The user information pieces have a one-to-one correspondence with the people who use the home server 100. The user name is a name indicating a user. The user name is a name, nickname, etc. of the user, and is input or changed by an operation of the user. The user ID is identification information that uniquely indicates the user. The user IDs "0001", "0002", "0005", etc. included in the user table 146 are all protection target data pieces that belong to the protection target class "ID".

The viewing history charts 151, 153, etc. record viewing histories of television broadcasts viewed by each user, and each of the respective viewing histories correspond to a different one of the users.

FIG. 5B shows the particulars of the viewing history chart 151. As shown in FIG. 5B, the viewing history chart 151 includes a user ID 175 and a plurality of viewing history information pieces 176, 177, 178, etc. The user ID 175 indicates the user corresponding to the viewing history chart 151, and here matches the user ID "0001" included in the user information piece 171 of the user table 146.

Each viewing history information piece includes a date and time, a channel, a program name, and a genre. The program name is a name of a television program viewed by the user indicated by the user ID 175, and the channel is the channel on which the television program was broadcast. The date and time indicate when the user began viewing. The genre indicates the genre of the program. Such viewing history information pieces are all protection target data pieces belonging to the protection target class "viewing history".

The structure of the viewing history charts 153, etc. is the same as the viewing history chart 151.

Figure 6A:
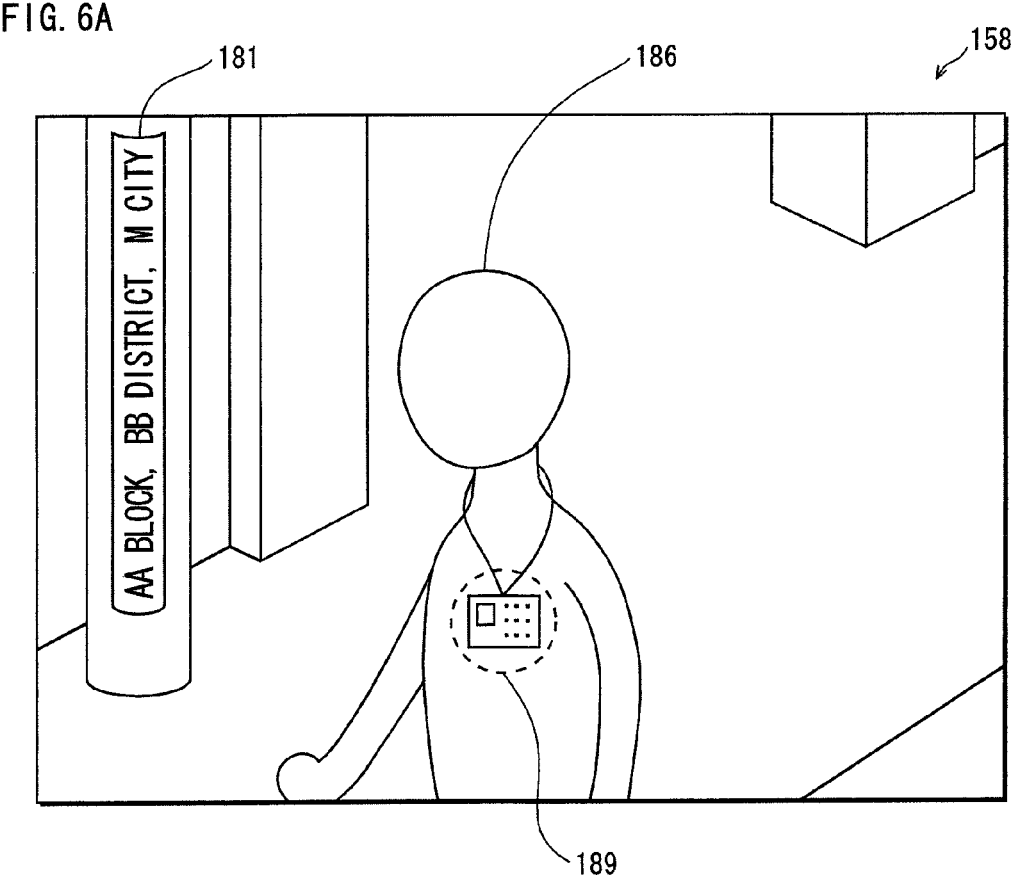
FIG. 6 shows a photograph 158 as a specific example.
Figure 6B:
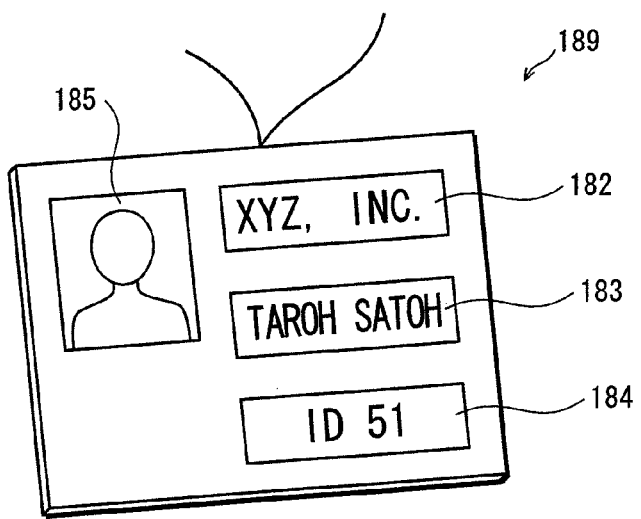
Figure 8:
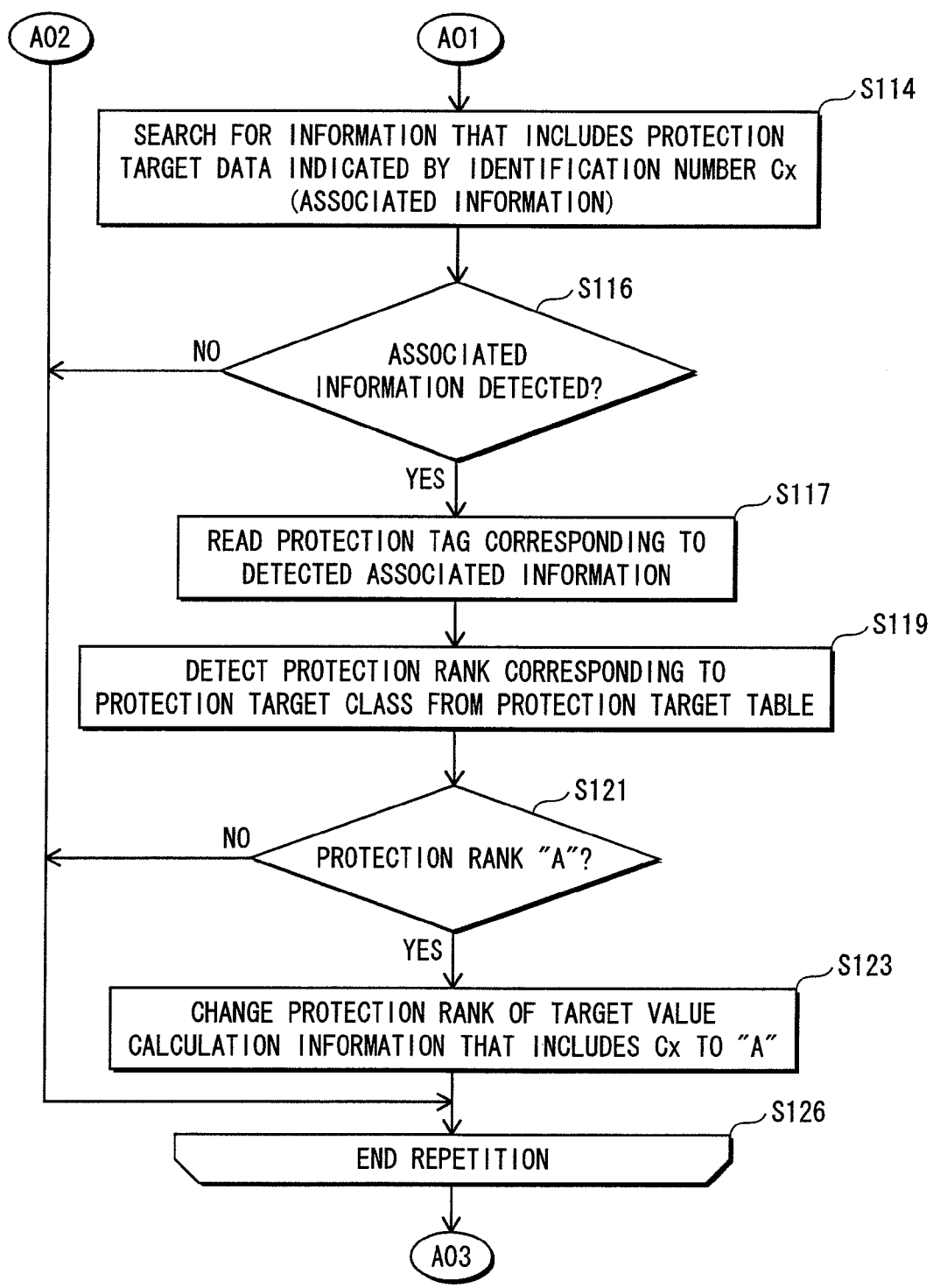
FIG. 8 is a flowchart showing the judgment and modification processing performed by the modification judgment unit 106, continued from FIG. 7.
Figure 9:
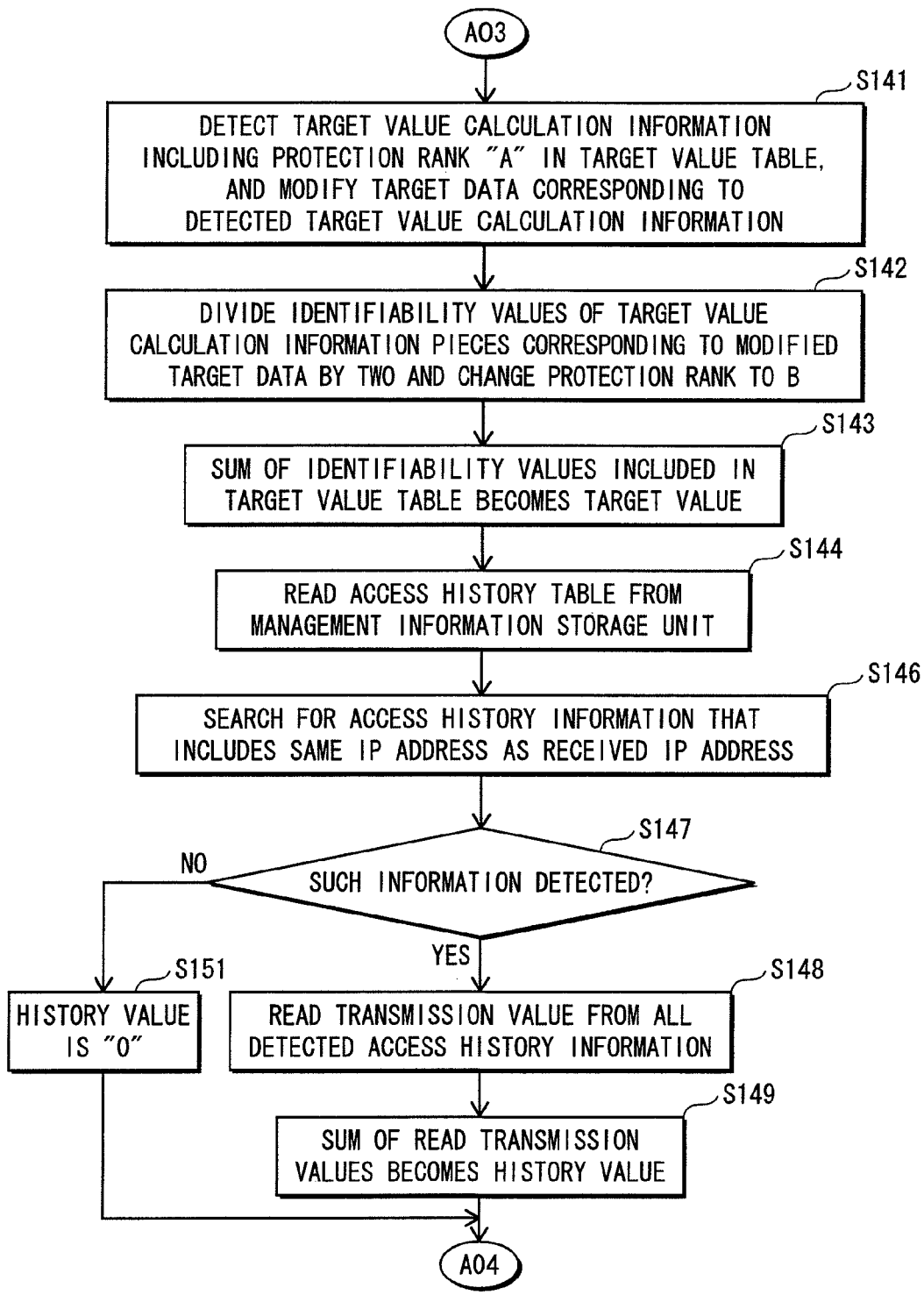
FIG. 9 is a flowchart showing the judgment and modification processing performed by the modification judgment unit 106, continued from FIG. 7.
Figure 10:
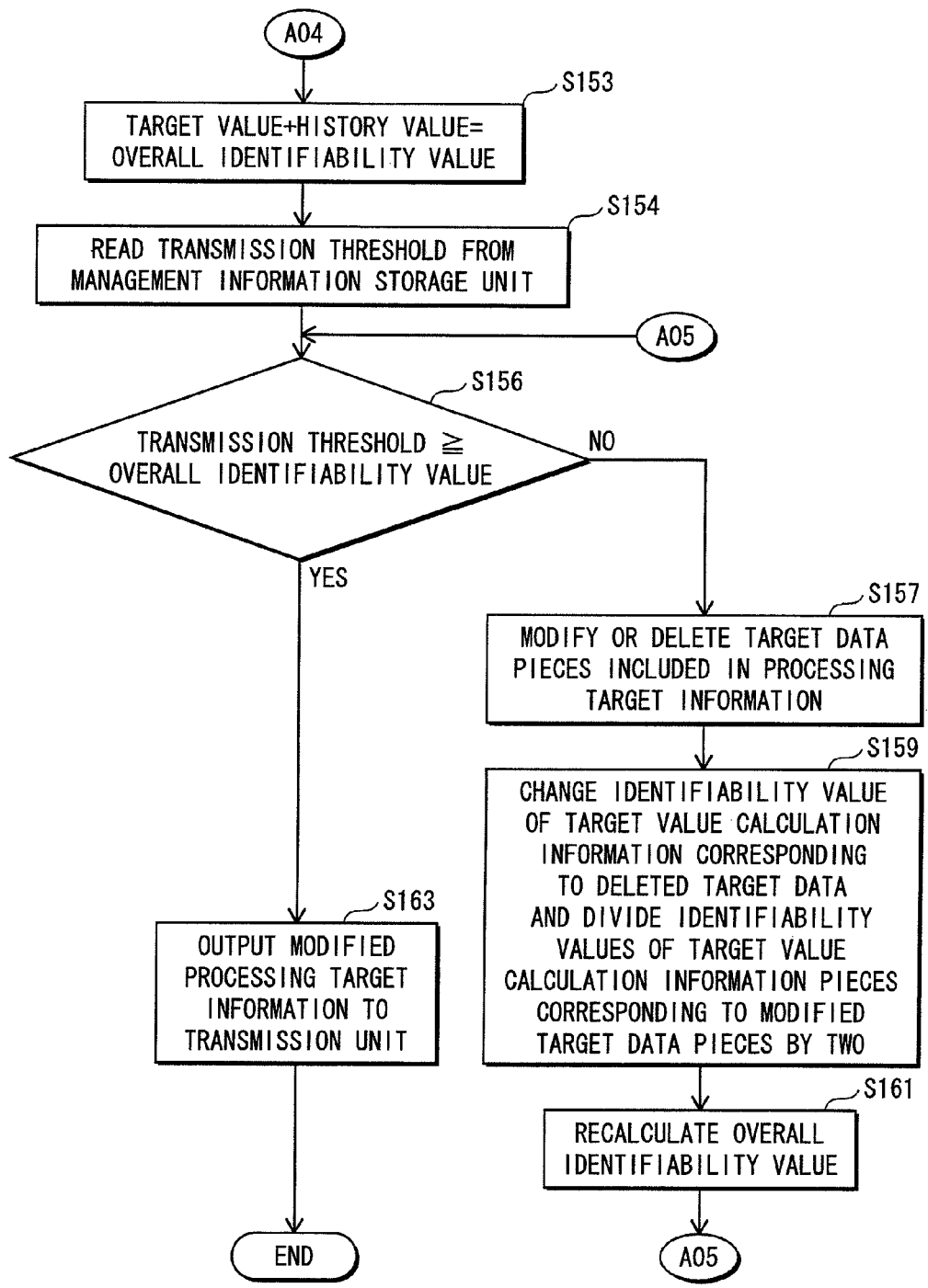
FIG. 10 is a flowchart showing the judgment and modification processing performed by the modification judgment unit 106, continued from FIG. 7.

The photographs 158, 160 etc. are static images captured by a digital camera, mobile telephone, or the like, and are, for example, JPEG-formatted information. FIG. 6A shows the photograph 158 as a specific example. FIG. 6B is an enlarged view of a dashed circle portion 189 of the photograph 158. As shown in FIG. 6A, the photograph 158 has been taken of a person who has an ID card. A character string 181 that reads "AA Block, BB District, M City" that is printed on an address marker on an electricity pole appears in the photograph 158, along with a character string 182 that reads "XYZ, Inc.", a character string 183 that read "Taroh Satoh", a character string 184 that reads "ID 51", and a facial image 186, which are all shown on the ID card. These are all pieces of protection target data.

"AA Block, BB District, M City" belongs to the protection target class "address". "XYZ, Inc." belongs to the protection target class "company name". "Taroh Satoh" belongs to the protection target class "name". "ID 51" belongs to the protection target class "ID". The facial image 186 belongs to the protection target class "face". Note that since the facial photograph 185 of the person whose name is written on the ID card is not sufficiently clear to be used to identify the individual, here, the facial photograph 185 is not considered protection target data.

The photograph 160 depicts a natural landscape or the like, and does not include any protection target data.

The video 162 was taken with a digital video camera, and is, for example, MPEG 2 or MPEG 4-formatted information. A person's movements and voice have been captured on the video 162. The video 162 includes image data belonging to the protection target class "face" and voice data belonging to the protection target class "voice".

The program content is a television program broadcast from a broadcast station, and the television program has been recorded in accordance with an operation by the user.

Each of the protection tags 142, 144, 147, etc. is in correspondence with one of the information pieces stored by the information storage unit 110, and indicates the protection target class to which the protection target data included in the corresponding information belongs.

For example, the protection tag 142 corresponds to the owner name 141, and indicates that the protection target data included in the owner name 141 belongs to the protection target class "name".

The protection tag 152 corresponds to the viewing history chart 151, and indicates that the viewing history chart 151 includes protection target data belonging to the protection target class "ID" and protection target data belonging to the protection target class "viewing history". Also, the protection tag 159 corresponds to the photograph 158, and indicates that a plurality of protection target data pieces belonging to the protection target classes "name", "face", "address", "ID" and "company ID" are included in the photograph 158.

(3) Antenna 101 and Broadcast Reception Unit 102

In accordance with control performed by the control unit 107, the broadcast reception unit 102 performs signal processing to select a predetermined frequency bandwidth from among broadcast waves received by the antenna 101, and generates program content pertaining to the predetermined channel. The broadcast reception unit 102 writes the generated program content to the information storage unit 110, or outputs the generated program content to the display output unit 113.

(4) Input Unit 112, Display Output Unit 113 and Monitor 15

The input unit 112 includes various buttons such as a numeric keypad and an enter key, and receives input of various information and instructions via an operation of the user. Upon receiving the input, the input unit 112 outputs the received information and instructions to the control unit 107.

The display output unit 113 is connected to the monitor 15. The display output unit 113 receives the program content from the broadcast reception unit 102, generates image data and audio data based on the received program content, and outputs the generated image data and audio data to the monitor 15.

Also, in accordance with control performed by the control unit 107, the display output unit 113 outputs various types of image data such as menu screens, and various types of audio data such as beep tones, to the monitor 15.

The monitor 15 is, for example, a liquid crystal display, and includes a speaker. The monitor 15 generates and displays or outputs screens and audio with use of the image data and audio data output by the display output unit 113.

(5) I/O Unit 103

A recording medium such as a memory card can be inserted into the I/O unit 103, which reads information from the recording medium in accordance with control performed by the control unit 107.

(6) Request Reception Unit 104, Transmission Unit 108, and LAN Communication Unit 109

In accordance with control performed by the control unit 107, the request reception unit 104 receives a transmission request from the external device that is connected to the Internet 20, and outputs the received transmission request to the search unit 105. The transmission request is a request for transmission of information of various types such as a "viewing history chart", an "owner name", a "photograph" etc., and includes an IP address of the external device transmitting the request. Here, the external device is, for example, the server apparatus 400.

In accordance with control performed by the control unit 107, the transmission unit 108 transmits the various types of information to the external device that is connected to the Internet 20.

In accordance with instructions from the control unit 107, the search unit 105 and the modification judgment unit 106, the LAN communication unit 109 receives various types of information from, and transmits various types of information to, a terminal apparatus that is connected to the LAN 10. The terminal apparatus connected to the LAN 10 is, for example, the laptop computer 300.

(7) Control Unit 107

The control unit 107 is connected to the constituent elements of the home server 100, and is a functional unit that controls the respective operations of the constituent elements.

When the power button is pressed and power supply begins, the control unit 107 checks, via the I/O unit 103 and the LAN communication unit 109, whether a recording medium has been inserted, and checks via the LAN 10 whether a terminal apparatus that can perform transmission exists. The display output unit 113 then instructs the monitor 15 to display a start screen requesting the user to input a user ID. The user ID input by the user is received from the input unit 112. When the user ID is received, the control unit 107 instructs the display output unit 113 to display a menu screen of functions, such as "view television broadcast", "change settings", "transfer information from media", and "play back content", to be provided to the user by the home server 100. Thereafter, the control unit 107 receives a user operation via the input unit 112, and in accordance with the received operation, performs various types of processing such as changing information stored in the management information recording unit 111, transferring information from recording media to the information storage unit 110, and playing back content stored in the information storage unit 110. In particular, before writing new information to the information storage unit 110, the control unit 107 searches for protection target data by analyzing the content of the new information, and if protection target data is detected in the content of the new information, the control unit 107 generates a protection tag indicating a protection target class to which the detected protection target data belongs, and writes the generated protection tag to the information storage unit in correspondence with the new information.

Various known technologies, such as voice recognition, image analysis, text recognition, identification of addresses and names, and designation of facial images of individuals, are used to detect protection target data. As an example of such technology, patent document 2 discloses technology for designating place names and addresses in character strings. Also, an exemplary method of detecting an ID in text data or image data is judging that a character string is an ID if the character string is a meaningless series of characters that follows (or is in the vicinity of) a name or an organization name recognized by the above known technology. Note that this judgment method is one example, and other methods may be used.

Also, upon acquiring the transmission request from the external device, the request reception unit 104 temporarily stores the date and time when the transmission request was acquired, and causes the acquired transmission request to be output to the search unit 105. Also, upon transmitting the information in accordance with the transmission request, the transmission unit 108 generates access history information including the stored date and time, the IP address of the external device that was received along with the transmission request, and a target value (the particulars of which are described later) calculated by the modification judgment unit 106. Here, the target value calculated by the modification judgment unit 106 is the transmission value. Next, the control unit 107 adds the generated access history information to the access history table 133.

(8) Search Unit 105

The search unit 105 receives the transmission request from the server apparatus 400 via the Internet 20 and the request reception unit 104. Upon receiving the transmission request, the search unit 105 decodes the received transmission request, and searches for the requested information in the information storage unit 110. The search unit 105 reads the detected information pieces and the protection tags corresponding to the information pieces.

Next, if a terminal apparatus that can communicate over the LAN 10 connected to the home apparatus 100, the search unit 105 also searches for the requested information in the connected terminal apparatus via the LAN transmission unit 109, and reads the detected information pieces and the protection tags corresponding to each detected information piece.

For example, when the laptop computer 300 is connected to the home server 100 as shown in FIG. 1, and the received transmission request is for transmitting a photograph, the search unit 105 reads the photographs 158, 160, etc. and the protection tags corresponding to each photograph from the information storage unit 110, and then via the LAN communication unit 109, instructs the laptop computer 300 to search for the requested information. If the photograph is stored in the laptop computer 300, the search unit 105 receives the photograph and the corresponding protection tag from the laptop computer 300 via the LAN communication unit 109.

Next, the search unit 105 outputs the read information and protection tag to the modification judgment unit 106. Note that when a corresponding protection tag does not exist as in the case of the photograph 160 shown in FIG. 4, the search unit 105 only outputs the photograph 160.

(9) Modification Judgment Unit 106

The modification judgment unit 106 receives the information piece and the protection tag corresponding to the information piece from the search unit 105. However, the information piece may not have a protection tag. An information piece that does not have a protection tag does not include data to be protected.

After the information is received, the modification judgment unit 106 judges, from a standpoint of personal information protection, for each information piece, whether the information piece can be transmitted as is, and if the information cannot be transmitted as is, modifies (or deletes) the protection target data included in the information.

When the above-described judgment and modification is finished, the modification judgment unit 106 outputs the modified information to the transmission unit 108.

FIGS. 7 to 10 are flowcharts showing the above-described judgment and modification processing performed by the modification judgment unit 106. The processing of the modification judgment unit 106 is described below with use of FIGS. 7 to 10. Note that for convenience, the information targeted for judgment and modification in the present explanation is referred to as processing target information.

If there are no protection tags among the processing target information pieces received from the search unit 105 (step S101: NO), the modification judgment unit 106 outputs the received processing target information pieces to the transmission unit 108 as is (step S103), and ends the judgment and modification processing.

If a protection tag is attached to one or more of the received processing target information pieces (step S101: YES), all protection target data pieces included in the processing target information pieces are designated in accordance with the received protection tags (step S102). Similarly to the processing of the control unit 107, known technologies such as image recognition, text recognition, designation of names and addresses, and designation of personal facial images are used for designating protection target data pieces.

The n number (n being 1 or more) of protection target data pieces designated here are, respectively, given identification numbers C1, C2, etc., to Cn. Provided that the identification numbers are information that can be used to designate each protection target data piece within the information, the identification numbers may be merely serial numbers or random numbers, or each may be an address in the memory where the protection target data piece is held. Alternatively, if the processing target information pieces are image data, the identification numbers may be the locations of pixels that correspond to the protection target data pieces. The identification numbers may also be any combination of the above.

Figures 11, 12:
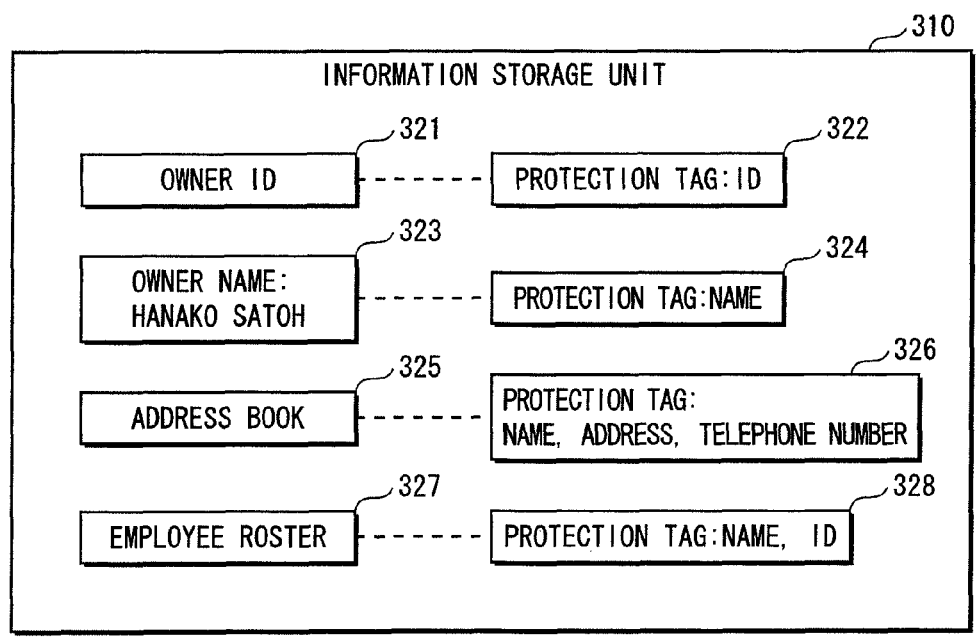
FIG. 11 shows the particulars of a target value table generated during the judgment and modification processing performed by the modification judgment unit 106.
FIG. 12 shows exemplary information stored in an information storage unit 310.
Figure 13:
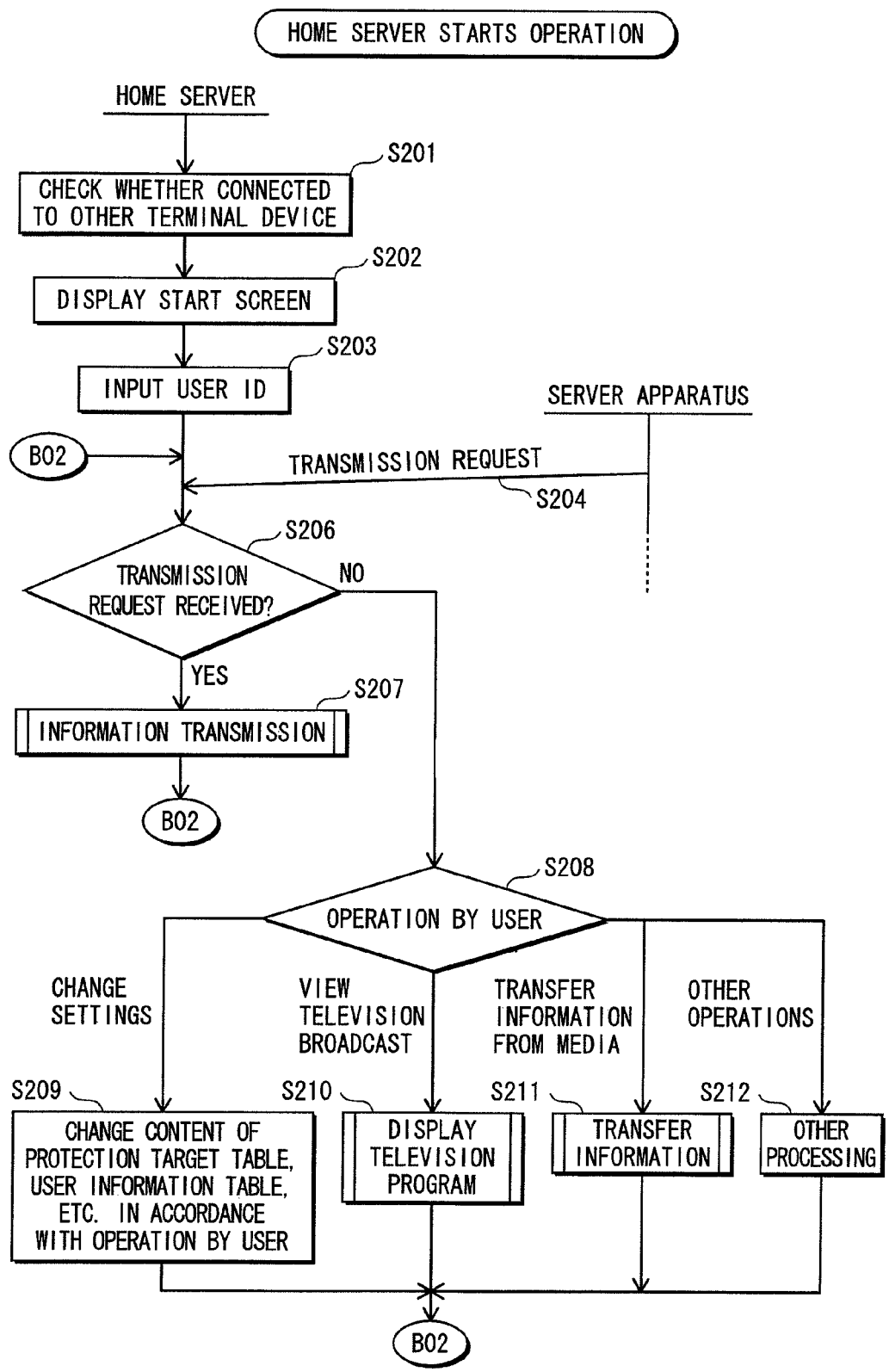
FIG. 13 is a flowchart showing operation of the home server 100.

Next, the modification judgment unit 106 reads the protection target table 121 from the management information storage unit 111 (step S104). The modification judgment unit 106 extracts, from the protection target table 121, the identifiability value and the protection rank corresponding to each designated protection target data piece, and generates a target value table (step S106). FIG. 11 shows the particulars of a target value table 201 generated here. As shown in FIG. 11, the target value table 201 includes n pieces (in the drawing, n=5) of target value calculation information pieces 202, 203, 204, 205, and 206. Each target value calculation information piece corresponds to a designated protection target data piece. Each target value calculation information piece includes an identification number, an identifiability value, and a protection rank. The identification number is added to each protection target data piece as described above. The identifiability value and the protection rank are those that correspond to the protection target class to which the protection target data piece indicated by the identification number belongs.

Next, in steps S108 to S126, the modification judgment unit 106 repeats the processing of the below steps S109 to S123 for each identification number C1 to C5 included in the target value table 201.

The modification judgment unit 106 selects a target value calculation information piece including an identification number $Cx (0 \leq x \leq 5)$ (step S109), and reads a protection rank from the selected target value calculation information piece (step S111). If the protection rank is not "B" (step S113: NO), the modification judgment unit 106 proceeds to processing pertaining to the next identification number Cx.

If the protection rank is "B" (step S113: YES), the modification judgment unit 106 searches the information storage unit 110 for other information that includes the same data as the protection target data piece indicated by the identification number Cx (hereinafter, information that is associated with a processing target information piece and that can be easily searched for by the home server 100 is referred to as associated information. In the present embodiment, information in the processing target information that includes the same data as the protection target data is considered associated information) (step S114). If a terminal apparatus that can communicate over the LAN 10 exists, the modification judgment unit 106 requests the terminal apparatus, via the LAN communication unit 109, to search for associated information. If associated information is not detected in the information storage unit 110 or any terminal apparatus connected to the LAN 10 (step S116: NO), the modification judgment unit 106 proceeds to processing pertaining to the next identification number Cx.

If associated information pieces are detected (step S116: YES), the modification judgment unit 106 reads the protection tags corresponding to the detected associated information pieces (step S117).

The modification judgment unit 106 detects, in the protection target table 121, protection ranks in correspondence with the protection target classes indicated by the read protection tags (step S119). If there is a protection rank "A" among the detected protection ranks (step S121: YES), protection ranks included in target value calculation information pieces that include the identification number Cx are changed to "A" (step S123).

If the protection rank "A" is not included (step S121: NO), the modification judgment unit 106 proceeds to processing pertaining to the next identification number Cx.

After the repetition of the steps S108 to S126 has ended, the modification judgment unit 106 detects target value calculation information pieces having the protection rank "A" in the target value table. The modification judgment unit 106 modifies, in the processing target information, protection target data information pieces that are indicated by the identification numbers of the detected target value calculation information pieces (step S141). The method of modification can be determined arbitrarily. For example, if the processing target information piece is a photograph, a mosaic is applied to the portion in which protection target data appears, and if the processing target information piece is a piece of text data, the portion that is protection target data is deleted or replaced with a meaningless character string.

Next, the modification judgment unit 106 divides the identifiability values of the target value calculation information pieces corresponding to the modified protection target data pieces by two and changes the protection rank to "B" (step S142). Note that if the target value table does not include any target value calculation information pieces having the protection rank "A", steps S141 to S142 are omitted.

Next, the modification judgment unit 106 calculates a sum of all identifiability values of the target value calculation information pieces in the target value table. The calculated sum becomes the target value (step S143).

The target value indicates the ease of identifying an individual with use of the information actually transmitted to the source of the transmission request. The higher the target value, the more easily the specific individual can be identified.

Next, the modification judgment unit 106 reads the access history table 133 from the management information storage unit 111 (step S144), and searches the read access history table 133 for access history information pieces that include the same IP address as the IP address received along with the transmission request (step S146).

If such access history information pieces exist (step S147: YES), transmission values are read from all of the detected access history information pieces (step S148), and a sum of the read transmission values is calculated. The calculated sum becomes a history value (step S149).

The history value indicates the ease of identifying an individual with use of information transmitted previously to the device that is the source of the transmission request.

In step 5147, if such access history information pieces do not exist (step S147: NO), the history value is "0" (step S151).

The modification judgment unit 106 then calculates an overall identifiability value by adding the target value to the history value (step S153). Next, the modification judgment unit 106 reads the transmission threshold 131 from the management information storage unit 111 (step S154). The modification judgment unit 106 compares the read transmission threshold 131 to the calculated overall identifiability value, and if the calculated overall identifiability value is less than or equal to the transmission threshold 131, outputs the modified processing target information to the transmission unit 108 (step S163).

If the calculated overall identifiability value is greater than the transmission threshold 131 (step S156: NO), the modification judgment unit 106 modifies or deletes some or all of the protection target data pieces included in the protection target information (step S157). The pieces of protection target data to modify or delete may be selected arbitrarily. For example, protection target data pieces corresponding to the target value calculation information pieces may be modified or deleted in order from the top of the target value table, or protection target data pieces having higher identifiability values may be modified or deleted preferentially.

Next, the modification judgment unit 106 changes the identifiability values included in the target value calculation information pieces corresponding to the deleted protection target data pieces to "0", and divides the identifiability values included in the target value calculation information pieces corresponding to the modified protection target data pieces by two (step S159).

Next, the modification judgment unit 106 calculates a new target value based on the target value table resulting from the processing of step S159, and recalculates an overall identifiability value with use of the calculated target value (step S161), then returns to step S156.

Note that here, to simplify the description, a case has been described in which one piece of information is received from the search unit 105. If a plurality of information pieces are received, a target value table is generated for each information piece, and a sum of all identifiability values included in all of the target information tables becomes the target value.

1.3 Laptop Computer 300

As shown in FIG. 2, the laptop computer includes a LAN communication unit 301, a search unit 305, a control unit 307, an information storage unit 310, an input unit 312 and a display unit 313. Also, although not depicted specifically, the control unit 307 is connected to all of the constituent elements, and controls the constituent elements.

The laptop computer 300 is a computer system that specifically includes a RAM, a ROM, and a microprocessor. The RAM and the ROM store computer programs. The microprocessor, by operating according to the computer programs, enables realization of some of the functions of the laptop computer 300.

The following describes the constituent elements.

(1) LAN Communication Unit 301

The LAN communication unit 301 includes an interface that can connect to the LAN 10. The LAN communication unit 301 performs transmission and reception of various types of information and instructions between the search unit 305 and an external device connected to the LAN 10. Here, the external device is the home server 100.

(2) Search Unit 305

The search unit 305 receives an instruction from the home server 100 via the LAN communication unit 301 to search the information storage unit 310 for information and read the information. In accordance with the instruction, the search unit 305 searches for the information in the information storage unit 310 and reads the information.

(3) Information Storage Unit 310

The information storage unit 310 includes a hard disk, and stores various types of information. For example, as shown in FIG. 12, the information storage unit 310 stores an owner ID 321, an owner name 323, an address book 325, an employee roster 327, and protection tags 322, 324, 326, and 328 that correspond to the information pieces.

The owner name 323 is a name of the owner of the laptop PC 300, and the owner ID 321 is a piece of identification information that uniquely identifies the owner. The address book 325 is information created by the user, and includes names, addresses, telephone numbers, etc. of a plurality of people. The employee roster 327 includes names and corresponding employee IDs of a plurality of people.

The protection tags are the same as in the above-described information storage unit 110.

(4) Control Unit 307

The control unit 307 receives input of various types of information and instructions from the user via the input unit 312, and controls the operations of the constituent elements according to the received instructions.

Also, similarly to the control unit 107 of the home server 100, when recording new information to the information storage unit 310, the control unit 307 searches for protection target data by analyzing the content of the information, and if protection target data is detected, generates protection tags indicating protection target classes to which the detected protection target data belong, and writes the generated protection tags to the information storage unit 310 in correspondence with the information pieces.

(5) Input Unit 312 and Display Unit 313

The input unit 312 includes various buttons such as a numeric keypad and an enter key, receives input of various pieces of information and instructions via an operation by the user, and outputs the received information and instructions to the control unit 307.

The display unit 313 includes a liquid crystal display, and displays various screens in accordance with the control unit 307.

1.4 Server Apparatus 400

The server apparatus 400 is an apparatus that, in accordance with operation by an operator, collects various types of information pertaining to the user from external devices including the home server 100, and provides services and information matching the interests and preferences of the user based on the collected information.

For example, after collecting a viewing history of television broadcasts, the server apparatus 400 performs services such as announcing television broadcasts matching the preferences of the user, and introducing newly released DVDs matching the preferences of the user.

1.5 Operation

The following describes the operation of the various devices in the personal information management system 1 with a focus on the home server 100.

(1) Operation of the Home Server 100

FIGS. 13 to 16 are flowcharts showing operation of the home server 100. The following describes the operation of the home server 100 with reference to the flowcharts of FIGS. 13 to 16.

When power is applied to the home server 100 and electricity begins to be supplied to the various units, the control unit 107 checks, via the LAN communication unit 109, whether the home server 100 is connected to another terminal apparatus that can communicate over the LAN 10 (step S201). In the present embodiment, the home server 100 is connected to the laptop computer 300.

Next, the home server 100 generates a start screen including a message requesting the user to input a user ID, and instructs the display output unit 113 to display the generated start screen. In accordance with an instruction by the control unit 107, the display output unit 113 causes the start screen to be displayed on the monitor 15 (step S202). The control unit 107 then receives the user ID input by the user from the input unit 112 (step S203).

Meanwhile, the server apparatus 400 transmits a transmission request to the home server 100 via the Internet 20 in accordance with an operation by the operator (step S204).

After the user ID is received, when the request reception unit 104 receives the transmission request from the server apparatus 400 via the Internet 20 (step S206: YES), the control unit 107 instructs the request reception unit 104 to output the received transmission request to the search unit 105.

The search unit 105 receives the transmission request from the request reception unit 104, and starts transmission processing (the particulars of which are described later) of the requested information (step S207).

If a transmission request is not received (step S206: NO), the control unit 107 then causes a menu screen to be displayed on the monitor 15. The menu screen displays various functions that the home server 100 provides to the user. The control unit 107 receives a selection operation from the user (step S208). The exemplary menu screen displays a list of selectable functions such as "change settings", "view television broadcast" and "transfer information from media".

Upon receiving a request to change settings as an operation via the input unit 112 (step S208: "Change Settings"), the home server 100 changes the protection target table 121 and the transmission threshold 131 that are stored in the management information storage unit 111, and the user table 146 that is stored in the information storage unit 110, in accordance with the operation of the user (step S209).

Upon receiving a request to view a television broadcast as an operation via the input unit 112, (step S208: "View Broadcast"), the home server 100 starts processing (the particulars of which are described later) for displaying a television program (step S210).

Upon receiving, as an operation via the input unit 112, a request to transfer information from media such as a memory card (step S208: "Transfer from Media"), the control unit 107 performs processing (the particulars of which are described later) for transferring information (step S211).

Also, upon receiving, as an operation via the input unit 112, a request for other processing (step S208: "Other Processing"), the other processing is performed (step S212).

After the processing requested in step S208 has ended, processing returns to step S206.

(2) Display of Television Program

Figure 14:
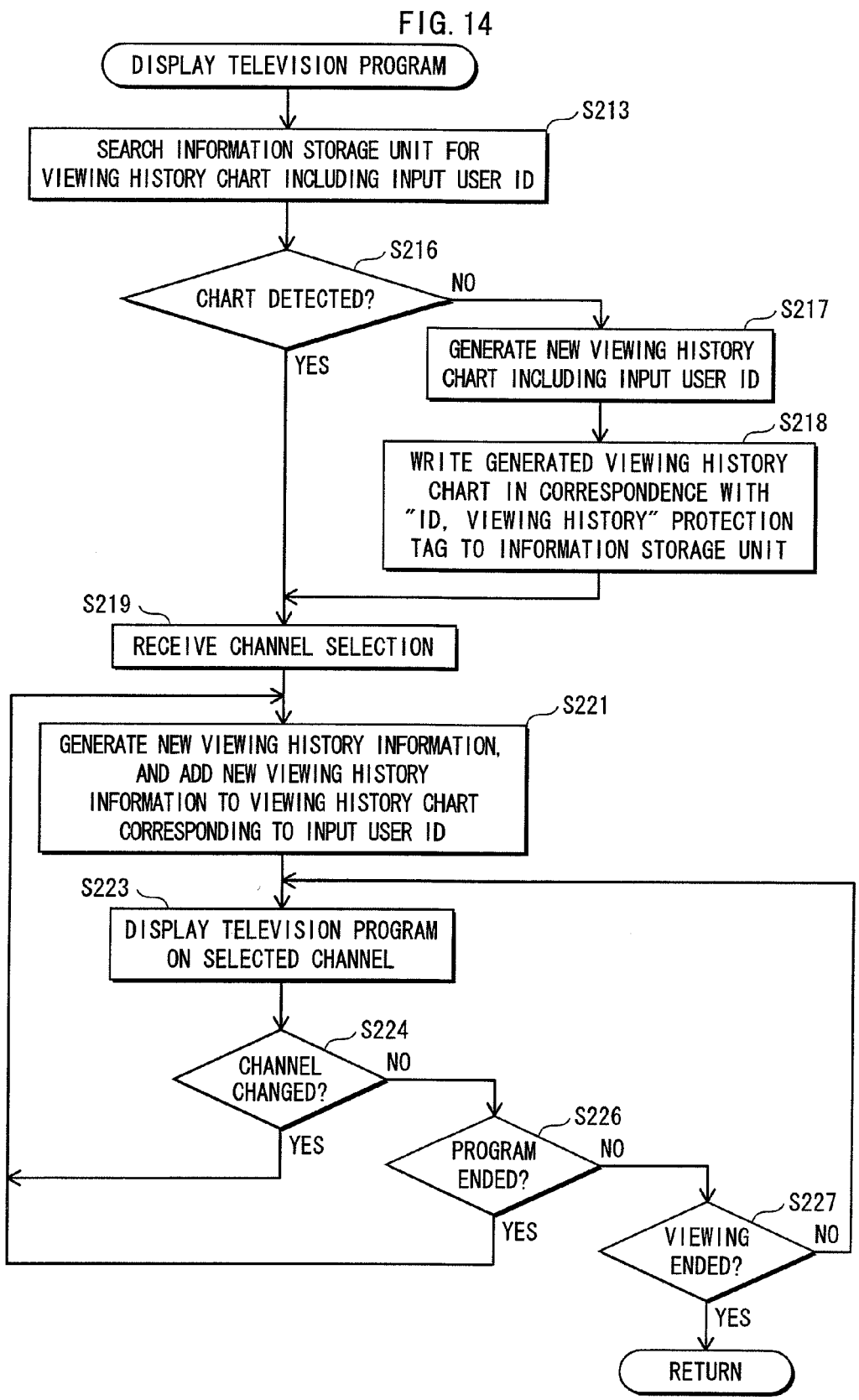
FIG. 14 is a flowchart showing processing for displaying a television program.

Upon receiving a request to view a television broadcast via the operation of the user, the home server 100 performs processing to display the television program. The following describes the processing to display the television program with use of the flowchart of FIG. 14. Note that FIG. 14 illustrates the particulars of step S210 in FIG. 13.

The control unit 107 searches the information storage unit 110 for a viewing history chart corresponding to the user ID input by the user in step S203 (step S213). If the viewing history chart corresponding to the input user ID is detected (step S216: YES), processing proceeds to step S219.

If the viewing history chart that includes the input user ID is not detected (step S216: NO), the control unit 107 generates a new viewing history chart that includes the input user ID (step S217). Next, the control unit 107 generates an "ID, viewing history" protection tag, and writes the generated viewing history chart to the information storage unit 110 in correspondence with the generated protection tag (step S218).

The control unit 107 then receives a channel selection via the input unit 112 (step S219), and instructs the broadcast reception unit 102 to receive the broadcast on the selected channel. Next, the control unit 107 generates new viewing history information including the selected channel number, etc., and adds the generated viewing history information to the viewing history chart corresponding to the user ID input by the user (step S221). Note that although not specifically depicted, an EPG (Electronic Program Guide) is stored in the information storage unit 110, and when a new piece of viewing history information is generated, the control unit 107 acquires a program name and a genre from the EPG.

In accordance with the instruction from the control unit 107, the antenna 101 and the broadcast reception unit 102 receive the television program, and cause the television program to be displayed on the monitor 15 (step S223). If the user performs an operation to change the channel while the television program is being displayed (step S224: YES), or if the television program ends (step S226: YES), processing returns to step S221, and a new viewing history information piece is added.

If the user performs an operation to end viewing while the broadcast program is being displayed (step S227: YES), the control unit 107 ends the processing for displaying the television program, and returns to step S206. If the channel has not been changed (step S224: NO), and the viewing has not been ended by the user (step S227: NO), display of the television program continues until the broadcast program ends (step S226: NO).

(3) Transfer of Information

Figure 15:
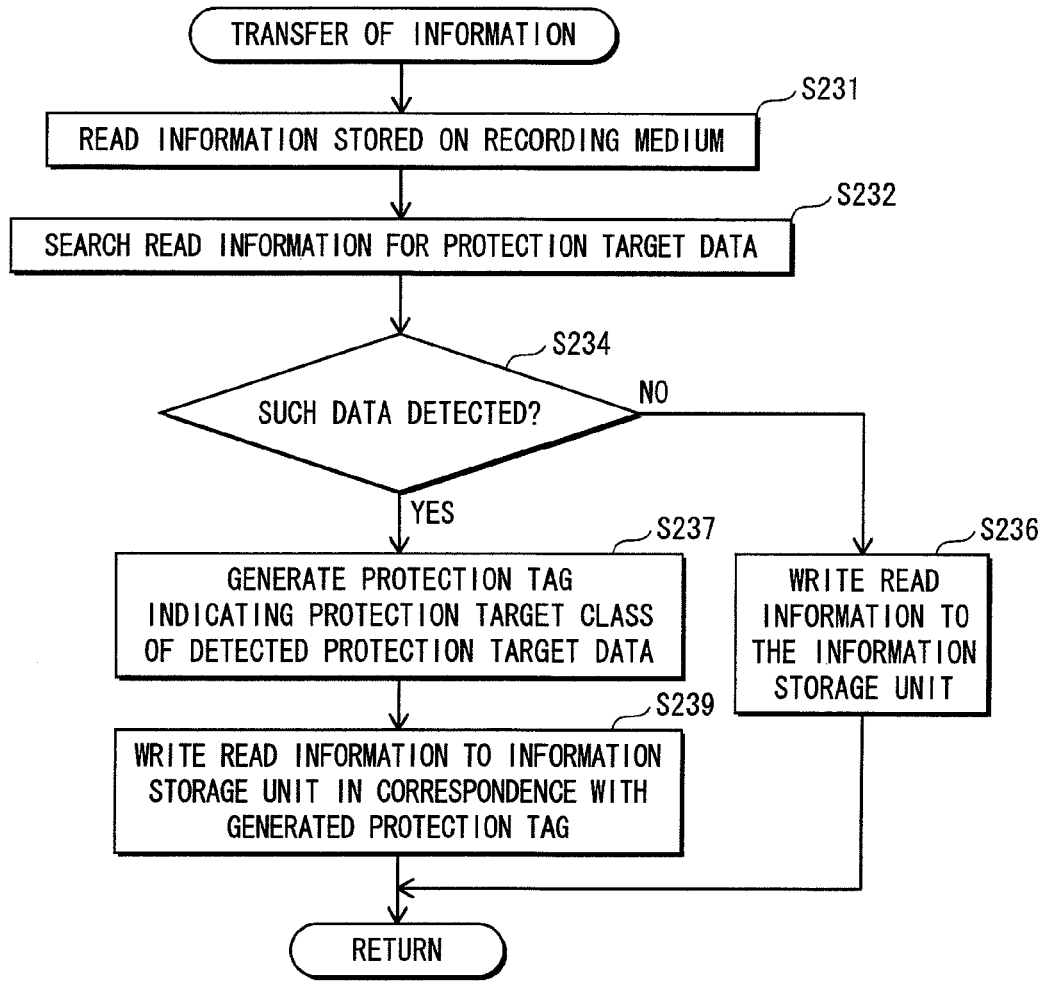
FIG. 15 is a flowchart showing processing for transferring information.

Upon receiving an operation via the input unit 112 requesting information to be transferred from a medium such as a memory card, the home server 100 performs processing for transfer from the medium. The following describes the transfer processing of the information with use of the flowchart of FIG. 15. Note that FIG. 15 shows the particulars of step S211 in FIG. 13.

The control unit 107, via the I/O unit 103, reads information recorded on the recording medium (step S231), and searches for protection target data by analyzing the read information (step S232). The analysis can be performed using various types of technology such as image recognition, text recognition, and voice recognition.

If protection target data is not included in the read information (step S234: NO), the read information is written to the information storage unit 110 as is (step S236).

If the read information includes protection target data (step S234: YES), the home server 100 generates a protection tag indicating a protection target class to which the detected protection target data belongs (step S237) and writes the read information to the information storage unit 110 in correspondence with the generated protection tag (step S239).

(4) Information Transmission

Figure 16:
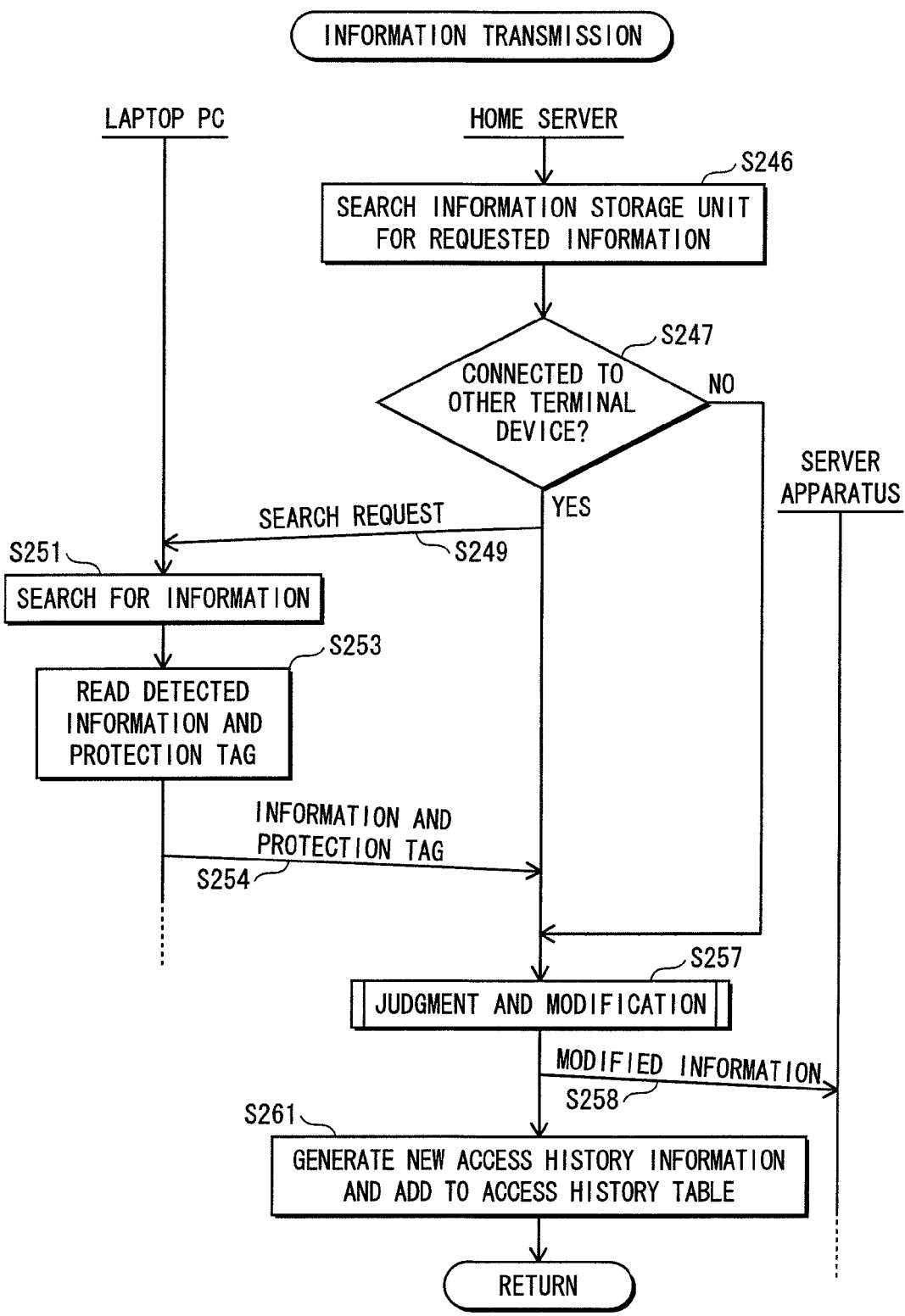
FIG. 16 is a flowchart showing processing for transmitting information to a server apparatus 400.

Upon receiving a transmission request from the request reception unit 104, the search unit 105 starts the information transmission processing described below. The following describes the information transmission processing with use of the flowchart shown in FIG. 16. FIG. 16 shows the particulars of step S207 in FIG. 13.

The control unit 107 causes the request reception unit 104 to output the received transmission request to the search unit 105.

The search unit 105 receives the transmission request, and searches for the requested information in the information storage unit 110 (step S246). At this time, if the laptop computer 300 is connected to the LAN 10 (step S247: YES), the search unit 105 requests, via the LAN communication unit 109, the laptop computer 300 to search for the requested information (step S249).

The search unit 305 of the laptop computer 300 receives a search request from the home server 100 via the LAN communication unit 301. The search unit 305 searches the information storage unit 310 in accordance with the received search request (step S251). If information pieces matching the request are detected, the search unit 305 reads the detected information pieces and the protection tags corresponding to the information pieces (step S253), and transmits the read information pieces and the protection tags to the home server 100 via the LAN communication unit 301 (step S254). If information pieces matching the request are not detected, instead of performing steps S253 and 254, the search unit 305 transmits a signal indicating that such information does not exist.

The search unit 105 of the home server 100 receives the information pieces and the protection tags from the laptop computer 300 via the LAN communication unit 109. The search unit 105 outputs the received information pieces, the information pieces detected in the information storage unit 110, and the protection tags corresponding to the information pieces to the modification judgment unit 106.

The modification judgment unit 106 receives the information pieces and the protection tags from the search unit 105, and of the received information pieces, judges whether the information pieces can be transmitted, and modifies any information that cannot be transmitted (step S257). The particulars of step S257 have already been described with use of the flowcharts of FIG. 7 to FIG. 10.

The transmission unit 108 receives the modified information pieces from the modification judgment unit 106, and transmits the received information pieces to the server apparatus 400 via the Internet 20 (step S258).

The control unit 107 generates access history information pertaining to the transmitted information, such access history information including the target value calculated by the modification judgment unit 106, the time when the transmission request was received from the server apparatus 400, and the IP address of the server apparatus 400 transmitted along with the transmission request. The control unit 107 adds the generated access history information to the access history table 133 stored by the management information storage unit 111 (step S261).

(5) Specific Examples

In regards to the above-described transmission processing of information, the following specifically describes, with reference to FIGS. 6, 7 to 10, and 16, an example of receiving, from the server apparatus 400, a transmission request that requests transmission of a photograph. At this time, the laptop computer 300 is connected to the LAN 10, and can communicate with the home server 100. Also, the IP address of the home server apparatus 400 is "10.105.5.6".

The search unit 105 searches the information storage unit 110 and the information storage unit 310 of the laptop computer 300 for photographs, and detects the photographs 158 and 160 in the information storage unit 110 (step S246). The search unit 105 reads, and outputs to the modification judgment unit 106, the detected photographs 158 and 160 and the protection tag 159 that corresponds to the detected photograph 158.

The modification judgment unit 106 receives the photograph 158, the protection tag 159, and the photograph 160 from the search unit 105.

Since the photograph 160 does not have a corresponding protection tag (step S101: NO), the modification judgment unit 106 outputs the photograph 160 to the transmission unit 108 as is (step S103).

Since the photograph 158 has the corresponding protection tag 159 (step S101: YES), the modification judgment unit 106 analyzes the image in the photograph 158, detects the character string 181 of the protection target class "address", the character string 182 of the protection target class "company name", the character string 183 of the protection target class "name", the character string 184 of the protection target class "ID", and the facial image 186 of the protection target class "face" (step S102). The identification numbers C1 to C5 are attached to the five detected protection target data pieces in order.

At this time, technologies such as image analysis, text recognition, and designation of names and addresses are used for detecting the facial image 186 and the character strings 181, 182, and 183 that are pieces of protection target data.

Also, despite not having any meaning independently, the character string 184 can be classified as belonging to the personal information class "ID" since a predetermined condition is fulfilled, namely appearing less than or equal to a predetermined distance from the character string 181 that is a "company name", the character string 183 that is a "name", and the facial photograph 185 (even though the photograph is not sufficiently distinct to specify a person). The predetermined distance is based on the size of the character string 184. Note that this method is one example, and other methods may be used.

The modification judgment unit then reads the protection target table 121 from the management information storage unit 111. Next, since the character string 181 belongs to the protection target class "address", the modification judgment unit 106 reads the identifiability value "8" and the protection rank "A" from the protection target information 123, and generates the target value calculation information piece 202 whose identification number is C1, whose identifiability value is "8", and whose protection rank is "A". Similarly, for the other protection target data pieces, the modification judgment unit 106 generates target value calculation information pieces 203, 204, 205, and 206, and generates the target value table 201 including such information pieces (step S106).

Next, the modification judgment unit 106 designates the target value calculation information pieces 203 and 205 that include the protection rank "B" in the target information table 201 (steps S109 to S113).

The modification judgment unit 106 searches the information storage unit 110 and the information storage unit 310 for associated information that includes the same protection target data as the character string 182 "XYZ, Inc." corresponding to the designated target value calculation information 203, and associated information that includes the same protection target data as the character string 184 "ID 51" corresponding to the target value calculation information piece 205 (step S114). Here, the employee roster 327 stored in the information storage unit 310 of the laptop computer 300 includes the character string "ID 51" that matches the character string 184 "ID 51" (step S116: YES).

The modification judgment unit 106 reads the protection tag 328 corresponding to the employee roster 327 via the LAN communication unit 109 (step S117). The protection target classes indicated by the read protection tag 328 are "name" and "ID".

The modification judgment unit 106 selects the protection target information pieces 122 and 125 that have the protection target classes "name" and "ID" from the protection target table 121, and detects the protection ranks "A" and "B" of the selected protection target information pieces 122 and 125, respectively (step S119). Since "A" is included in the detected protection ranks (step S121: YES), the modification judgment unit 106 changes the protection rank of the target value calculation information 205 corresponding to the character string 184 "ID 51" from "B" to "A" in the target value table 201 (step S123). After the change, the protection ranks of the target value calculation information pieces 202, 204, 205, and 206 are "A" in the target value table 201.

The modification judgment unit 106 then modifies the character strings 181, 183, and 184, and the facial image 186, which correspond to the target value calculation information pieces 202, 204, 205 and 206 that have the protection rank "A" (step S141). For example, the modification judgment unit 106 applies a mosaic to the facial image 186 portion, paints a colored block over the vicinity of the portion of the character string 181 reading "AA Block, BB District, M City", paints a colored block over the vicinity of the second half portion of the character string 183 that reads "Taroh Satoh", and paints a colored block over the vicinity of the last three characters of the character string 184 that reads "ID 51". Next, the modification judgment unit changes the protection rank of the target value calculation information pieces 202, 204, 205, and 206 to "B", and divides the identifiability values of the information pieces by 2 (step S142). Digits after the decimal point are dropped.

At this time, the identifiability values of the target value calculation information pieces are "4", "3", "5", "2", and "5", respectively. The modification judgment unit 106 adds these identifiability values together to obtain the target value "19" (step S143).

The modification judgment unit 106 then searches for access history information including the IP address "10.101.5.6" in the access history table 133 (step S146), and searches for the access history information piece 134 (step S147: YES). The modification judgment unit 106 reads the history value "17" from the detected access history information piece 134 (step S148). Since one piece of history information was detected, in this case, the read transmission value "17" becomes the history value "17" (step S149).

Next, the modification judgment unit 106 calculates the overall identifiability value "36" by adding the target value "19" to the history value "17" (step S153). The modification judgment unit 106 reads the transmission threshold 131 which is "30", and compares the overall identifiability value "36" to the transmission threshold 131 which is "30". Since the overall identifiability value is greater than the transmission threshold (step S156: NO), the modification judgment unit 106 further modifies the target data included in the photograph 158. Here, for example, the modification judgment unit 106 further modifies the character string 183 "Taroh Satoh" and the facial image 186, which correspond to the target value calculation information pieces 204 and 206 that have the highest identifiability value, namely "5" (step S157). For example, the modification judgment unit 106 fills in the entirety of the character string 183 "Taroh Satoh" with a colored background, and applies a more complicated mosaic to the facial image 186. The modification judgment unit 106 then changes the identifiability value of the target value calculation information piece 204 to "0", and obtains "2" by dividing "5", which is the identifiability value of the target value calculation information piece, by "2" (step S159). The modification judgment unit 106 then obtains a new target value "11" by adding the identifiability values "4", "3", "0", "2", and "2" included in the changed target value table 201, then adds together the target value "11" and the history value "17" to obtain the overall identifiability value "28" (step S161).

Since the overall identifiability value "28" obtained by the recalculation is less than or equal to the judgment threshold "30" (step S156: YES), the modification judgment unit 106 next outputs the modified photograph 158 to the transmission unit 108 (step S163).

The transmission unit 108 receives the photograph 160 and the modified photograph 158 from the modification judgment unit 106, and transmits the photograph 160 and the modified photograph 158 to the server apparatus 400 via the Internet 20 (step S258).

The control unit 107 generates new access history information including the date and time when the transmission request was received, the IP address "10.101.5.6" included in the transmission request, and the transmission value "11".

This transmission value, "11", is the last target value "11" calculated by the modification judgment unit 106.

Next, the generated access history information is added to the access history table 133 (step S261).

1.6 Conclusion and Effect

As described above, the home server 100 of the personal information management system 1 of embodiment 1 has pre-stored the protection target table 121 that provides an identifiability value and a protection rank for each type of protection target data. When there is a request to transmit information from the server apparatus 400, the home server 100 extracts the respective identifiability values and protection ranks of the protection target data pieces included in the requested information (processing target information) from the protection target table.

The protection target data pieces whose extracted protection rank is "A" are unconditionally targeted for modification, and are never transmitted to the server apparatus 400 as is.

Furthermore, for each protection target data piece whose extracted protection rank is "B", the home server 100 searches for associated information that relates to the protection target data piece, and if such associated information includes protection target data whose protection rank is "A", the home server 100 changes the protection rank of the original protection target piece from "B" to "A". The protection target data piece, whose protection rank is "A" after the change, is modified.

For this reason, even information that is not independently considered to be personal information is never transmitted to the server apparatus 400 as is if the information can be easily correlated with associated information that includes personal information.

This structure enables more reliable protection of personal information by keeping confidential not only information that can be used independently to identify an individual, but also information that can be used to identify the individual depending on the availability of associated information that can be easily correlated with the information.

Furthermore, for each modified processing target information piece, the home server 100 calculates the target value and the history value respectively, compares the overall identifiability value that is a sum of the target value and the history value to the transmission threshold, and if the overall identifiability value is greater than the transmission threshold, also modifies the protection target data whose protection rank is "B".

There is a risk of data whose protection rank is "B" becoming protection rank "A", due to the existence of personal information held by a terminal apparatus that is not connected on the LAN when the transmission request is received, or personal information that is later recorded to the home server 100.

As shown above, establishing a condition based on a transmission threshold and modifying information having the protection rank "B" as well as "A" enables reducing this type of risk.

Also, when making a judgment with consideration to the history value when a large amount of information transmitted from the home server 100 is collected together in the server apparatus 400, the risk of the information transmitted from the home server 100 being used to identify an individual can be suppressed.

The following describes the correspondence between the inventions described in the claims and the specific constituent elements in embodiment 1.

In claim 1, the request acquisition unit corresponds to the request reception unit 104, the read unit corresponds to the search unit 105, and the identifiability value acquisition unit and the judgment unit correspond to the modification judgment unit 106.

In claim 2 and claim 25, the modification unit corresponds to the modification judgment unit 106, and the output unit corresponds to the transmission unit 108.

The prohibition unit of claim 3 corresponds to the modification judgment unit 106 of the home server 100.

The first acquisition unit of claim 4 corresponds to the search unit 105 of the home server 100.

The generation unit of claim 10 corresponds to the control unit 107 of the home server 100.

The change unit of claim 11 corresponds to the control unit 107 of the home server 100.

The associated information acquisition unit of claim 12 corresponds to the modification judgment unit 106 of the home server 100.

The notification unit of claim 24 corresponds to the control unit 107, the display output unit 133, and the transmission unit 108 of the home server 100. A blinking red mark 501 shown in FIG. 17A, a risk display bar 502 shown in FIG. 17B, and a received e-mail screen 503 shown in FIG. 17C notify a result of the processing by the notification unit to the user.

1.7 Other Variations

Although described based on the above embodiments, the present invention is of course not limited to such embodiments. Variations such as the following are also included in the present invention.

(1) In embodiment 1, out of the protection target data pieces included in the processing target information, the protection target data pieces that have the protection rank "A" are unconditionally modified. The overall identifiability value is calculated based on the history value, which is calculated based on the access history table and the target value that is the sum of the identifiability values corresponding to the modified protection target data pieces. A judgment of whether to transmit the requested information as is or to modify the information is made according to the calculated overall identifiability value. However, the sequence of modification, the method of calculating the overall identifiability value, and the judgment method are not limited to being as described above.

For example, concerning the associated information, a sum of the identifiability values corresponding to all of the protection target data pieces included in the associated information (an associated value) may be calculated, and the sum of the target value, the associated value, and the history value may become the overall identifiability value.

Also, the following method may be used. When the protection rank of a target value calculation information piece has been changed to "A" due to the existence of associated information that includes a protection target data piece whose protection rank is "A", the modification judgment unit 106 reads an identifiability value from the protection target table 121. The identifiability value corresponds to the protection target data piece whose protection rank is "A" included in the associated information. The modification judgment unit 106 changes not only the protection rank, but also the identifiability value of the target value calculation information piece to match the read identifiability value. Next, a target value is obtained by adding together all of the identifiability values included in the target value table, and an overall identifiability value is obtained by adding together the target value and the history value. If the obtained overall identifiability value is greater than the transmission threshold, the modification judgment unit 106 modifies the processing target information.

Also, rather than using the history information, the modification judgment unit 106 may determine whether to modify the processing target information by comparing the target value to the overall identifiability value.

Also, modified processing target information may be transmitted after performing modification based only on the protection rank.

(2) Also, the information may be transmitted after performing modification based only on the overall identifiability value. In this case, the target value may be calculated based on the protection target table 121 and the protection target class indicated by the protection tag, independently of the number of protection target data pieces included in the processing target information.

Specifically, the protection target table 121 specifies protection target information pieces, including protection target classes indicated by the protection tag corresponding to each processing target information piece. The identifiability values of the designated protection target information pieces are read. If one of the protection tags includes a plurality of protection target classes, identifiability values are read separately for each of the protection target classes. A target value is obtained by adding all of the read identifiability values together. In such a case, a judgment of whether to perform modification can be performed rapidly after receiving the transmission request, since protection target information pieces are not detected individually in the processing target information. In particular, if the overall identifiability value is less than the transmission threshold, the processing target information can be transmitted rapidly.

Also, the protection tag may include the protection target information class and the number of protection target data pieces included in the protection target class. Specifically, if the names of three people are recorded in an address book, the protection tag corresponding to the address book includes the personal information class "name" and the number "3". At this time, the modification judgment unit 106 obtains the target value "30" by multiplying the identifiability value "10", which corresponds to the protection target class "name", by the number "3".

(3) Although in embodiment 1, associated information is considered to be information in the processing target information that includes the same data as the protection target data, associated information is not limited to being only information that includes the same data, and may also be information that includes data that partially matches the protection target data.

When assigning IDs to employees at a company, etc., there are cases in which employees in the same department or employees hired in the same year are given IDs having the same first few characters, and the remaining characters are serial numbers.

Also, there are cases in which files created on the same device using the same software are assigned file IDs that have the same first several bits. For example, the first eight bits is identification information of the user, the following eight bits is information classifying the software, and the last eight bits is a character string assigned uniquely to each file.

Accordingly, there appears to be some association between two or more people indicated by employee IDs that partially match. Also, files indicated by file IDs that partially match are considered to be associated with the same person or to a plurality of people who can use the same device in a single environment. For this reason, considering associated information to be information that includes protection target data that partially matches the protection target data included in the processing target information, as in the present variation, enables more reliable protection of personal information.

(4) As a history of information transmitted to an external device, the home server 100 stores an access history table 133 including a transmission value. However, the home server 100 may store an access history table including, in place of the transmission value, a dead copy of the information that was actually transmitted, and the dead copy and the protection target table 121 may be used to calculate the history value. Alternatively, a dead copy of the information detected by the search unit 105 (that is, as yet unmodified information) may be used.

Also, in place of the transmission value, an access history table may include, for example, identification information indicating information detected by the search unit 105 (that is, as yet unmodified information) in accordance with the transmission request, and addresses and the like stored in the detected information.

In such a case, the modification judgment unit 106 detects a protection target data piece for each piece of information recorded in the dead copy or the addresses, and obtains a history value by adding all of the identifiability values corresponding to the detected protection target data pieces.

(5) In embodiment 1, a judgment of whether to modify the protection target data pieces is made according to protection rank, and protection target data pieces whose protection rank is "A" are modified. Furthermore, the overall identifiability value is used to make another judgment of whether to modify the protection target data pieces included in the processing target data. However, the present invention also includes using either one of these methods independently.

(6) In embodiment 1, information that includes the same data as protection target information included in the processing target information is considered associated information. However, this is only an example, and associated information may be considered to be any information that relates to the processing target information and that the home server 100 can search for easily.

For example, information indicating a file name or a save destination address in the processing target information may be considered associated information. In such a case, if information whose protection rank is "A", in other words personal information, is included in the associated information, the file name or address in the processing target information is modified or deleted.

(7) Also, information held by a specified device may be considered associated information.

For example, all the information held by devices on the same LAN may be considered associated information.

Devices on the same LAN often belong to the same person or a closely associated person, such as a family member. For this reason, there is a very high likelihood that information pieces held by all of these devices pertain to the same person or to closely associated people. Accordingly, as in embodiment 1, even if the processing target information does not include data that appears to be associated with the associated information, an assumption can easily be made that information on the specified device is associated with the processing target information.

Note that in such a case, since the association between the processing target information and the associated information is not caused by the content of the processing target information, even if the processing target information is modified, the association between the processing target information and the associated information remains. For this reason, if the associated information includes data that can be used to identify an individual, transmission of the processing target information is cancelled.

Also, communication between the devices is not limited to being wired, and may be wireless or a combination of wired and wireless.

(8) Also, as another example, information held by a device in the vicinity of the home server 100 on the network may be considered associated information.

A device in the vicinity of the home server 100 is considered to be, for example, any device positioned so that the amount of time required for communication between the home server 100 and the device is less than or equal to a predetermined threshold.

In this case, suppose that a router is connected on a LAN cable to the Internet and a LAN. The LAN communication unit 109 pre-stores an address of a device with which the home server 100 communicates (either on or off the LAN). Before the search unit 105 searches for information requested by the server apparatus 400 or the modification judgment unit 106 searches for associated information, the LAN communication unit 109 first measures a communication time between the home server 100 and the device indicated by the pre-stored address. An exemplary measuring method is to transmit a ping command, and measure the length of time until a response signal is received.

The measured length of time is compared to a predetermined threshold, and any device whose communication time is less than or equal to the predetermined threshold is designated as a device in the vicinity of the home server 100. The search unit 105 or the modification judgment unit 106 search the information held by the designated device for processing target information and associated information.

In this case as well, if any detected associated information piece can be used to identify an individual, transmission of the processing target information is cancelled.

Also, instead of measuring the communication time, the number of relay devices may be counted, and information held by devices positioned so that the number of relay devices between the device and the home server 100 is less than or equal to a predetermined threshold may be considered associated information.

(9) Although in embodiment 1, the home server 100 is connected to the Internet 20 and the LAN 10, and searches information held by devices on the LAN for processing target information and associated information, the present invention is not limited to this, and the home server 100 may search information held by a predetermined device that can be communicated with over the Internet.

In this case, the home server 100 pre-registers the address of the device to be searched. This structure enables collectively protecting all information held by devices that have been registered (referred to as registered devices), even when devices owned by the same person, or closely associated persons such as a family members, have been set up in distant locations.

(10) Furthermore, the respective register devices of variation (9) above, including the home server 100, may, similarly to the home server 100, receive a transmission request from the server apparatus 400, and modify and transmit the requested information.

In this case, the transmission histories of all of the devices are managed as one. When calculating a history value, each device refers to transmission values not only pertaining to the information sent to the server apparatus 400 by that one device, but also information sent to the server apparatus 400 by the other registered devices.

(11) If protection target data whose protection rank is "A" is included in the processing target information detected by the search unit 105, the home server 100 may notify the user that information that can be used to identify an individual, or information associated with such information, has been requested by outputting a beep tone, a warning screen, or the like to the monitor 15.

More specifically, the search unit 105 notifies the control unit 107 that protection target data is included in the detected processing target information. Upon receiving the notification, the control unit 107 instructs the display output unit 113 to generate the beep tone or the warning screen. The screen output unit 113 generates the beep tone or the warning screen according to the instruction from the control unit 107, and outputs the beep tone or the warning screen to the monitor 15.

Note that rather than outputting the beep tone, the warning screen or the like to the monitor 15, the display output unit 113 may, via the transmission unit 108, output the beep tone, the warning screen or the like to another device connected to the home server 100 on the LAN 10. Also, the beep tone, the warning screen or the like may be output to a portable device connected to the home server 100 on a wireless LAN.

Furthermore, after using the beep tone, the warning screen or the like to notify the user, the home server 100 may cause the user to select whether to transmit the processing target information as is without modification, to cancel the transmission, or to modify the information before transmission.

Also, if protection target data whose protection rank is "A" is leaked over the network, the home server 100 may output the beep tone, the warning screen or the like to the monitor 15 to notify the user that personal information has been leaked.

Note that rather than outputting the beep tone, the warning screen, or the like to the monitor 15, the home server 100 may output the beep tone, the warning screen or the like to another device connected to the home server 100 on the LAN 10, or the beep tone, the warning screen or the like may be output to a transportable device connected to the home server 100 on a wireless LAN. In this case, the home server 100 may output the beep tone, the warning screen or the like with priority given to devices currently in use. Here, as an exemplary method of judging whether a device is in use, any device whose power is switched on that can receive an input from the user is considered a "device in use".

Also, the home server 100, instead of outputting the beep tone, the warning screen or the like, may notify the user that personal information has been requested or that personal information has leaked, for example, by sending an e-mail over a network or by calling a telephone on a telephone network or a mobile telephone network.

FIG. 17 shows specific examples of the warning screen and the like described above.

Figure 17A:
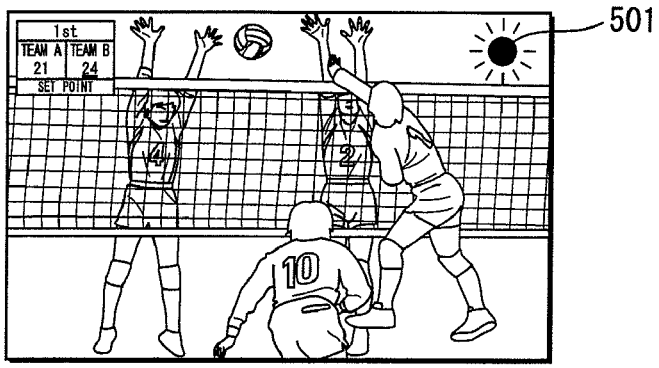
FIG. 17A shows a specific example of a warning screen output by the home server 100.

FIG. 17A shows a monitor of a television, computer or the like, and the blinking red mark 501 is displayed on the monitor. The user can be informed that personal information has been requested or that personal information has been leaked by the blinking red mark 501 displayed on the monitor.

Figure 17B:
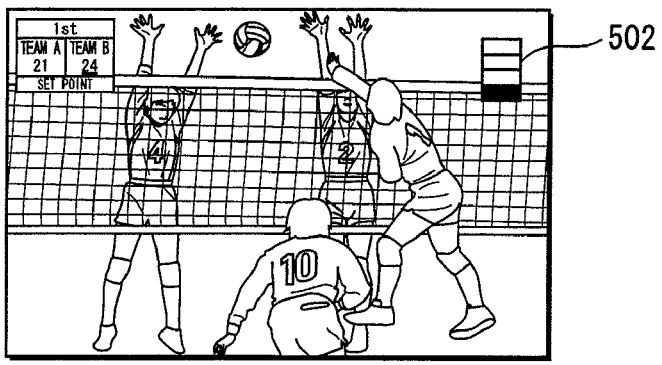
FIG. 17B shows another specific example of a warning screen output by the home server 100.

FIG. 17B shows the monitor of the television, computer or the like, and the risk display bar 502 displays a degree of risk as one of a plurality of levels. Here, the degree of risk indicates the importance of the requested personal information or the leaked personal information. The risk display bar 502 in FIG. 17B can indicate four levels of risk, and is currently indicating that the degree of risk is "1". The risk display bar 502 displayed on the monitor can inform the user that personal information has been requested or leaked, and furthermore can inform the user of the degree of importance of the requested or leaked personal information.

Figure 17C:
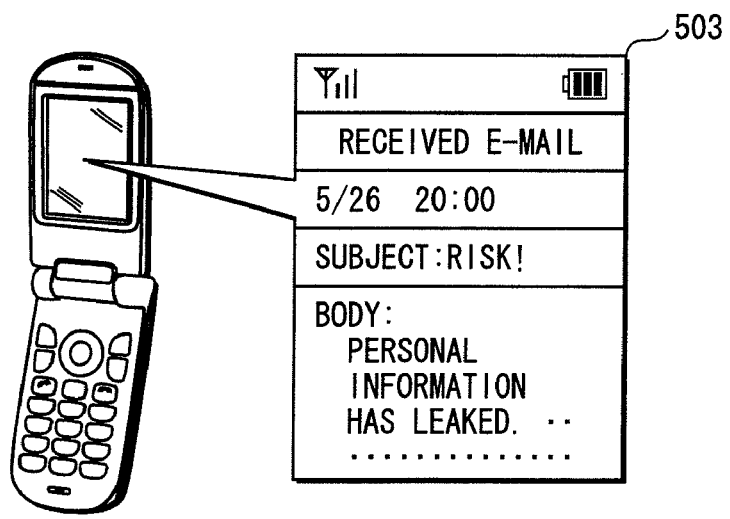
FIG. 17C shows a specific example of an e-mail transmitted from the home server 100.

FIG. 17C shows the received e-mail screen 503 output to the screen of a mobile telephone, after the e-mail has been transmitted from the home server 100 to the mobile telephone of the user notifying the user that personal information has been requested or leaked. In recent years, the number of people who own mobile telephones has grown, and transmitting this type of warning e-mail to the mobile telephone of the user enables informing the user more quickly that the personal information has leaked.

(12) In embodiment 1, a laptop computer 300 connected to the LAN 10 is described as an example of the device managed by the home server 100. However, the home server 100 may manage various other types of devices, such as mobile telephones, PDAs, car navigation systems, robots, video cameras, hard disk recorders, and other home information appliances.

Also, as shown in the protection target table of FIG. 3, examples of information protected by the home server 100 include names, addresses, voices, IDs, names of companies, and viewing histories. However, in addition to these, various types of information pertaining to individuals may be protected by the home server 100, such as household account books, website access histories, driven route histories, household floor plans, and diagrams showing the position of furniture.

(13) In embodiment 1, if the associated information includes protection target data whose protection rank is "A", the home server 100 changes the protection rank of the original protection target data piece that is associated with the associated information from "B" to "A". This original protection target data piece is then targeted for modification.

However, even if protection target data whose protection rank is "A" is not included in the associated information, if a specific individual can be identified when both the processing target information and the associated information are present, the protection target data included in the processing target information may be targeted for modification.

For example, assume that an employee ID is included in the processing target information, and the employee ID and a written report including the name of the company that issued the employee ID are detected as associated information. Since the employee ID corresponds to only one person in the company, if processing target information and associated information corresponding in this way are both present, there is a risk of facilitating identification of the individual to whom the employee ID corresponds.

In view of this, the modification judgment unit 106 pre-stores combinations of protection target classes of information that, even when information pieces from both classes have the protection rank "B", greatly facilitate identifying a specific individual when information belonging to both of the protection target classes are present. Here, a combination of the protection target classes "ID" and "company name" is recorded. As shown in the protection target table 121, the protection target classes "ID" and "company name" are both defined as having the protection rank "B".

The modification judgment unit 106 detects associated information pertaining to the protection target data (identification number Cx) included in the processing target information, and reads the protection tag corresponding to the detected associated information piece. When the protection target classes indicated by the read protection tags only correspond to the protection tag "B", and when the protection target class of the protection target data of the identifier Cx and the protection target class indicated the protection tag match one of the stored combinations, the protection rank of the protection target data indicated by the identifying number Cx is changed to "A".

(14) When the home server 100 and the laptop computer 300 write new information to the respective information storage units thereof, the home server 100 and the laptop computer 300 detect protection target data by analyzing the content of the information, and generate a protection tag indicating the detected protection target data. However, the present invention is not limited to this.

For example, devices other than the home server 100 are not required to have the function of detecting protection target data.

Also, when the home server 100 receives a transmission request, the modification judgment unit 106 may detect protection target data included in the processing target information, and specify the protection target class to which the detected protection target data belongs.

In these cases, after detecting the associated information, the modification judgment unit 106 analyzes the associated information, and judges whether protection target data whose protection rank is "A" is included in the associated information.

(15) As an example of modification processing, when the processing target information piece is a photograph, the modification judgment unit 106 of embodiment 1 applies a mosaic to the portion where the protection target data appears. However, in the present invention, modification processing of the protection target data is not limited to this, and various other types of modification processing may be used.

Furthermore, the present invention also includes performing modification processing on a portion, rather than the entirety, of the protection target data.

Specifically, if the processing target information piece is a photograph, and the protection target data piece belongs to the class "face", instead of applying a mosaic to the entire facial image appearing in the photograph, the modification processing unit 106 may apply a mosaic to the eyes only, and not apply the mosaic to the other portions. Modifying only the eyes, which are particularly important in identifying an individual, enables increasing the difficulty of determining the subject of the photograph while allowing the facial expression of the subject to remain.

(16) The devices described above may be computer systems structured specifically from a microprocessor, a ROM, a RAM, a hard disk unit, a display unit, a keyboard, a mouse, etc. Computer programs are stored in the RAM and the hard disk unit. The devices achieve their functions as the microprocessor operates in accordance with the computer programs. Instruction code which indicates commands to the computer is structured as a combination of multiple instruction codes in order for the computer programs to achieve predetermined functions.

(17) A portion or all of the constituent elements of the devices of the above embodiment and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. Computer programs are stored in the RAM. The system LSI achieves its functions as the microprocessor operates in accordance with the computer programs.

Also, the integration is not limited to LSI implementation, but instead may be realized by a dedicated circuit or a general-purpose process. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(18) A portion or all of the constituent elements of the devices of the above embodiment and variations may be structured as a removable IC card or stand-alone module. The IC card or the module may be tamper resistant.

(19) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(20) The present invention may be any combination of the above embodiment and variations.

Industrial Applicability

The present invention can be used operationally, continually, and repeatedly in the industry of manufacturing and selling devices that hold personal information and devices that can access the devices that hold the personal information.

The invention claimed is:

1. A personal information management apparatus comprising:
    an acquisition unit operable to acquire an output request for target information that is information targeted for output;
    a storage unit operable to store therein (i) information necessary for specifying an individual in correspondence with target value information that includes protection rank information and (ii) a threshold that divides a group of information pieces that can collectively identify the individual and a group of information pieces that cannot collectively identify the individual, the information necessary for specifying the individual being included in the target information, the target value information being information for judging if the target information is to be protected, and the protection rank information indicating a level of confidentiality of the information necessary for specifying the individual;
    a search unit operable to, in accordance with the protection rank information, search for associated information that includes information identical to the information necessary for specifying the individual;
    a determination unit operable to, if the associated information is found by the search unit, determine whether the target value information is to be changed, with use of the associated information;
    a change unit operable to change the target value information to generate changed target value information if a result of the determination by the determination unit is affirmative;
    an identifiability value determination unit operable to determine, with use of the target value information, an overall identifiability value indicating how easily the individual can be identified;
    a judgment unit operable to judge whether the target information is to be protected;
    a protection unit operable to protect the target information if the judgment unit has judged affirmatively; and
    an output unit operable to output the target information,
    wherein the judgment unit compares the overall identifiability value to the threshold, and if the overall identifiability value is greater than the threshold, judges that the target information is to be protected,
    wherein if the judgment unit has judged affirmatively, the protection unit modifies the information necessary for specifying the individual to generate modified information, wherein if the judgment unit has judged affirmatively, instead of the information necessary for specifying the individual, the output unit outputs the modified information, wherein the target value information further includes an identifiability value in correspondence with the information necessary for specifying the individual, wherein the identifiability value determination unit determines the overall identifiability value with use of the identifiability value, wherein the target information includes a plurality of information pieces necessary for specifying the individual, and wherein the identifiability value determination unit determines the overall identifiability value with use of a target value obtained by adding together all of a plurality of identifiability values that are in correspondence with the plurality of pieces of information necessary for specifying the individual.

2. The personal information management apparatus of claim 1, wherein the target value information further includes first protection tag information in correspondence with the information necessary for specifying the individual and the protection rank information, wherein the storage unit further stores therein the associated information and second protection tag information in correspondence with the associated information, and wherein if the associated information is found by the search unit, the determination unit searches for the first protection tag information associated with the second protection tag information, and determines whether the target value information is to be changed, with reference to the protection rank information in correspondence with the first protection tag information.

3. The personal information management apparatus of claim 2, wherein the target value information further includes identification information that identifies the information necessary for specifying the individual, and wherein the search unit searches for the associated information with use of the protection rank information and the identification information.

4. The personal information management apparatus of claim 1, wherein the judgment unit judges a piece of information necessary for specifying the individual that corresponds to a highest one of the plurality of identifiability values to be a facilitating portion that facilitates identifying the individual in the target information.

5. The personal information management apparatus of claim 1, wherein the storage unit further stores therein a history value, and wherein the identifiability value determination unit determines a value obtained by adding together the history value and the target value as the overall identifiability value.

6. The personal information management apparatus of claim 1, further comprising:

an associated information judgment unit, wherein the acquisition unit further acquires a transmission distance that indicates an amount of separation from a personal information management apparatus body, and wherein the associated information judgment unit compares the transmission distance to a predetermined threshold, and if the transmission distance is less than the predetermined threshold, judges information found by the search unit to be the associated information.

7. The personal information management apparatus of claim 1, wherein the acquisition unit further acquires the target information, and wherein the personal information management apparatus further comprises:
a generation unit operable to generate the target value information with use of the target information acquired by the acquisition unit.

8. The personal information management apparatus of claim 1, wherein the change unit changes the target value information in accordance with a user operation.

9. The personal information management apparatus of claim 1, wherein a personal information management apparatus body is connected to a terminal apparatus, information held in the personal information management body and the terminal apparatus being mutually usable by each other, and wherein the search unit searches one of the personal information management apparatus body and the terminal apparatus for the associated information.

10. The personal information management apparatus of claim 1, wherein the target information includes an address indicating a location where the associated information is stored, and wherein the search unit searches the location indicated by the address for the associated information.

11. The personal information management apparatus of claim 1, wherein the search unit searches a terminal apparatus connected via a network for the associated information.

12. The personal information management apparatus of claim 1, wherein the information necessary for specifying the individual is one of a name, an address, a facial image and a mobile telephone number, and wherein if the associated information includes one of the name, the address, the facial image and the mobile telephone number, the judgment unit judges affirmatively.

13. The personal information management apparatus of claim 1, wherein the target information is a photograph, and wherein the information necessary for specifying the individual is a predetermined graphic or a character string in the photograph.

14. The personal information management apparatus of claim 1, further comprising:

a notification unit operable to, if the determination unit has determined affirmatively, notify a user that output of information associated with the information necessary for specifying the individual has been requested.

15. A personal information management method used by a personal information management apparatus, the personal information management method comprising steps of:

storing, in the personal information management apparatus, (i) informations necessary for specifying an individual in correspondence with target value information that includes protection rank information and (ii) a threshold that divides a group of information pieces that can collectively identify the individual and a group of information pieces that cannot collectively identify the individual, the information necessary for specifying the individual being included in target information that is information targeted for output, the target value information being information for judging if the target information is to be protected, and the protection rank information indicating a level of confidentiality of the information necessary for specifying the individual;

acquiring an output request for the target information that is information targeted for output;

searching, in accordance with the protection rank information, for associated information that includes information identical to the information necessary for specifying the individual;

if the associated information is found by the search unit, determining whether the target value information is to be changed, with use of the associated information;

changing the target value information to generate changed target value information if a result of the determination by the determination unit is affirmative;

determining, with use of the target value information, an overall identifiability value indicating how easily the individual can be identified;

judging whether the target information is to be protected;

protecting the target information if the judgment unit has judged affirmatively, and outputting the target information, wherein the judgment step compares the overall identifiability value to the threshold, and if the overall identifiability value is greater than the threshold, judges that the target information is to be protected, wherein if the judgment step has judged affirmatively, the protection step modifies the information necessary for specifying the individual to generate modified information, wherein if the judgment step has judged affirmatively, instead of the information necessary for specifying the individual, the output step outputs the modified information, wherein the target value information further includes an identifiability value in correspondence with the information necessary for specifying the individual, wherein the determining step determines the overall identifibilty value with use of the identifaibility value, wherein the target information includes a plurality of information pieces necessary for specifying the individual, and wherein the determining step determines the overall identifiability value with use of a target value obtained by adding together all of a plurality of identifiability values that are in correspondence with the plurality of pieces of information necessary for specifying the individual.

16. A non-transitory computer-readable recording medium on which a personal information management program used by a personal information management apparatus has been recorded, wherein, when executed, the personal information management program causes the personal information management apparatus to perform a method comprising the steps of:

storing, in the personal information management apparatus, (i) information necessary for specifying an individual in correspondence with target value information that includes protection rank information and (ii) a threshold that divides a group of information pieces that can collectively identify the individual and a group of information pieces that cannot collectively identify the individual, the information necessary for specifying the individual being included in target information that is information targeted for output, the target value information being information for judging if the target information is to be protected, and the protection rank information indicating a level of confidentiality of the information necessary for specifying the individual;

acquiring an output request for the target information that is information targeted for output;

searching, in accordance with the protection rank information, for associated information that includes information identical to the information necessary for specifying the individual;

if the associated information is found by the search unit, determining whether the target value information is to be changed, with use of the associated information;

changing the target value information to generate changed target value information if a result of the determination by the determination unit is affirmative;

determining, with use of the target value information, an overall identifiability value indicating how easily the individual can be identified;

judging whether the target information is to be protected;

protecting the target information if the judgment unit has judged affirmatively, and outputting the target information, wherein the judgment step compares the overall identifiability value to the threshold, and if the overall identifiability value is greater than the threshold, judges that the target information is to be protected, wherein if the judgment step has judged affirmatively, the protection step modifies the information necessary for specifying the individual to generate modified information, wherein if the judgment step has judged affirmatively, instead of the information necessary for specifying the individual, the output step outputs the modified information, wherein the target value information further includes an identifiability value in correspondence with the information necessary for specifying the individual, wherein the determining step determines the overall identifibilty value with use of the identifaibility value, wherein the target information includes a plurality of information pieces necessary for specifying the individual, and wherein the determining step determines the overall identifiability value with use of a target value obtained by adding together all of a plurality of identifiability values that are in correspondence with the plurality of pieces of information necessary for specifying the individual.

17. An integrated circuit comprising:

an acquisition unit operable to acquire an output request for target information that is information targeted for output;

a storage unit operable to store therein (i) information necessary for specifyin~ an individual in correspondence with target value information that includes protection rank information and (ii) a threshold that divides a group of information pieces that can collectively identify the individual and a group of information pieces that cannot collectively identify the individual, the information necessary for specifying the individual being included in the target information, the target value information being information for judging if the target information is to be protected, and the protection rank information indicating a level of confidentiality of the information necessary for specifying the individual;

a search unit operable to, in accordance with the protection rank information, search for associated information that includes information identical to the information necessary for specifying the individual;

a determination unit operable to, if the associated information is found by the search unit, determine whether the target value information is to be changed, with use of the associated information;

a change unit operable to change the target value information to generate changed target value information if a result of the determination by the determination unit is affirmative;

an identifiability value determination unit operable to determine, with use of the target value information, an overall identifiability value indicating how easily the individual can be identified;

a judgment unit operable to judge whether the target information is to be protected;

a protection unit operable to protect the target information if the judgment unit has judged affirmatively; and an output unit operable to output the target information, wherein the judgment unit compares the overall identifiability value to the threshold, and if the overall identifiability value is greater than the threshold, judges that the target information is to be protected, wherein if the judgment unit has judged affirmatively, the protection unit modifies the information necessary for specifying the individual to generate modified information, wherein if the judgment unit has judged affirmatively, instead of the information necessary for specifying the individual, the output unit outputs the modified information, wherein the target value information further includes an identifiability value in correspondence with the information necessary for specifying the individual, wherein the identifiability value determination unit determines the overall identifiability value with use of the identifiability value, wherein the target information includes a plurality of information pieces necessary for specifying the individual, and wherein the identifiability value determination unit determines the overall identifiability value with use of a target value obtained by adding together all of a plurality of identifiability values that are in correspondence with the plurality of pieces of information necessary for specifying the individual.

* * * * *